(12) United States Patent
Antonakakis et al.

(10) Patent No.: US 10,257,212 B2
(45) Date of Patent: Apr. 9, 2019

(54) METHOD AND SYSTEM FOR DETECTING MALWARE

(71) Applicant: Help/Systems, LLC, Eden Prairie, MN (US)

(72) Inventors: Emmanouil Antonakakis, Dunwoody, GA (US); Robert Perdisci, Smyrna, GA (US); Wenke Lee, Atlanta, GA (US); Gunter Ollmann, Norcross, GA (US)

(73) Assignee: Help/Systems, LLC, Eden Prairie, MN (US)

( * ) Notice: Subject to any disclaimer, the term of this patent is extended or adjusted under 35 U.S.C. 154(b) by 0 days.

(21) Appl. No.: 15/384,025

(22) Filed: Dec. 19, 2016

(65) Prior Publication Data

US 2017/0201536 A1  Jul. 13, 2017

Related U.S. Application Data

(63) Continuation of application No. 14/041,796, filed on Sep. 30, 2013, now Pat. No. 9,525,699, which is a
(Continued)

(51) Int. Cl.
*H04L 29/06* (2006.01)
*H04L 29/12* (2006.01)
(Continued)

(52) U.S. Cl.
CPC ...... *H04L 63/1416* (2013.01); *G06F 9/45508* (2013.01); *G06F 21/577* (2013.01);
(Continued)

(58) Field of Classification Search
CPC ............ H04L 63/1416; H04L 63/1491; H04L 61/1511; H04L 63/1408; H04L 63/145;
(Continued)

(56) References Cited

U.S. PATENT DOCUMENTS

| 4,843,540 A | 6/1989 | Stolfo |
| 4,860,201 A | 8/1989 | Stolfo et al. |

(Continued)

FOREIGN PATENT DOCUMENTS

| WO | WO 2002/037730 A2 | 5/2002 |
| WO | WO 2002/098100 A1 | 12/2002 |
| WO | WO 2007/050244 A2 | 5/2007 |

OTHER PUBLICATIONS

Aas et al. "Text Categorisation: A Survey" (Jun. 1999) Norwegian Computing Center, pp. 1-38.
(Continued)

*Primary Examiner* — Catherine Thiaw
(74) *Attorney, Agent, or Firm* — Fredrikson & Byron, P.A.

(57) ABSTRACT

A system and method of analysis. NX domain names are collected from an asset in a real network. The NX domain names are domain names that are not registered. The real network NX domain names are utilized to create testing vectors. The testing vectors are classified as benign vectors or malicious vectors based on training vectors. The asset is then classified as infected if the NX testing vector created from the real network NX domain names is classified as a malicious vector.

18 Claims, 10 Drawing Sheets

Related U.S. Application Data continuation of application No. 12/985,140, filed on Jan. 5, 2011, now Pat. No. 8,578,497.

(60) Provisional application No. 61/295,060, filed on Jan. 14, 2010, provisional application No. 61/292,592, filed on Jan. 6, 2010.

(51) Int. Cl.
  *G06F 9/455* (2018.01)
  *G06N 99/00* (2010.01)
  *G06F 21/57* (2013.01)

(52) U.S. Cl.
  CPC ..... *G06N 99/005* (2013.01); *H04L 29/12066* (2013.01); *H04L 61/1511* (2013.01); *H04L 63/145* (2013.01); *H04L 63/1408* (2013.01); *H04L 63/1491* (2013.01); *H04L 29/06* (2013.01); *H04L 63/14* (2013.01)

(58) Field of Classification Search
  CPC ... H04L 63/14; H04L 29/06; H04L 29/12066; G06F 9/45508; G06F 21/577; G06N 99/005
  See application file for complete search history.

(56) References Cited

U.S. PATENT DOCUMENTS

| | | | |
|---|---|---|---|
| 5,363,473 A | 11/1994 | Stolfo et al. | |
| 5,497,486 A | 3/1996 | Stolfo et al. | |
| 5,563,783 A | 10/1996 | Stolfo et al. | |
| 5,668,897 A | 9/1997 | Stolfo | |
| 5,717,915 A | 2/1998 | Stolfo et al. | |
| 5,748,780 A | 5/1998 | Stolfo | |
| 5,920,848 A | 7/1999 | Schultzer et al. | |
| 6,401,118 B1 | 6/2002 | Thomas | |
| 6,738,908 B1 | 5/2004 | Bonn et al. | |
| 6,983,320 B1 | 1/2006 | Thomas et al. | |
| 7,013,323 B1 | 3/2006 | Thomas et al. | |
| 7,039,721 B1 | 5/2006 | Wu et al. | |
| 7,043,759 B2 | 5/2006 | Kaashoek | |
| 7,069,249 B2 | 6/2006 | Stolfo et al. | |
| 7,093,292 B1 | 8/2006 | Pantuso | |
| 7,136,932 B1 | 11/2006 | Schneider | |
| 7,152,242 B2 | 12/2006 | Douglas | |
| 7,162,741 B2 | 1/2007 | Eskin et al. | |
| 7,185,368 B2 | 2/2007 | Copeland, III | |
| 7,203,959 B2 | 4/2007 | Nachenberg et al. | |
| 7,225,343 B1 | 5/2007 | Honig et al. | |
| 7,277,961 B1 | 10/2007 | Smith et al. | |
| 7,278,163 B2 | 10/2007 | Banzhof et al. | |
| 7,290,283 B2 | 10/2007 | Copeland, III | |
| 7,331,060 B1 | 2/2008 | Ricciulli | |
| 7,372,809 B2 | 5/2008 | Chen et al. | |
| 7,383,577 B2 | 6/2008 | Hrastar et al. | |
| 7,424,619 B1 | 9/2008 | Fan et al. | |
| 7,426,576 B1 | 9/2008 | Banga et al. | |
| 7,448,084 B1 | 11/2008 | Apap et al. | |
| 7,475,426 B2 | 1/2009 | Copeland, III | |
| 7,483,947 B2 | 1/2009 | Starbuck et al. | |
| 7,487,544 B2 | 2/2009 | Schultz et al. | |
| 7,512,980 B2 | 3/2009 | Copeland et al. | |
| 7,519,818 B2 | 4/2009 | Levin et al. | |
| 7,519,994 B2 | 4/2009 | Judge et al. | |
| 7,536,360 B2 | 5/2009 | Stolfo et al. | |
| 7,549,169 B1 | 6/2009 | Sobel et al. | |
| 7,634,808 B1 | 12/2009 | Szor et al. | |
| 7,639,714 B2 | 12/2009 | Stolfo et al. | |
| 7,644,150 B1 | 1/2010 | Nucci et al. | |
| 7,644,151 B2 | 1/2010 | Jerrim et al. | |
| 7,657,935 B2 | 2/2010 | Stolfo et al. | |
| 7,665,131 B2 | 2/2010 | Goodman et al. | |
| 7,698,442 B1 | 4/2010 | Krishnamurthy | |
| 7,712,132 B1 | 5/2010 | Ogilvie | |
| 7,712,134 B1 | 5/2010 | Nucci et al. | |
| 7,752,125 B1 | 7/2010 | Kothari et al. | |
| 7,752,665 B1 | 7/2010 | Robertson et al. | |
| 7,779,463 B2 | 8/2010 | Stolfo et al. | |
| 7,784,097 B1 | 8/2010 | Stolfo et al. | |
| 7,809,670 B2 | 10/2010 | Lee et al. | |
| 7,818,797 B1 | 10/2010 | Fan et al. | |
| 7,882,542 B2 | 2/2011 | Neystadt | |
| 7,886,358 B2 | 2/2011 | Copeland, III | |
| 7,890,627 B1 | 2/2011 | Thomas | |
| 7,895,326 B2 | 2/2011 | Jerrim et al. | |
| 7,913,306 B2 | 3/2011 | Apap et al. | |
| 7,930,353 B2 | 4/2011 | Chickering et al. | |
| 7,962,798 B2 | 6/2011 | Locasto et al. | |
| 7,979,907 B2 | 7/2011 | Schultz et al. | |
| 7,996,288 B1 | 8/2011 | Stolfo | |
| 8,015,414 B2 | 9/2011 | Mahone et al. | |
| 8,019,764 B1 | 9/2011 | Nucci | |
| 8,065,722 B2 | 11/2011 | Barford et al. | |
| 8,074,115 B2 | 12/2011 | Stolfo et al. | |
| 8,161,130 B2 | 4/2012 | Stokes et al. | |
| 8,170,966 B1 | 5/2012 | Musat et al. | |
| 8,180,916 B1 | 5/2012 | Nucci et al. | |
| 8,200,761 B1 | 6/2012 | Tevanian | |
| 8,224,994 B1 | 7/2012 | Schneider | |
| 8,260,914 B1 | 9/2012 | Ranjan | |
| 8,341,745 B1 | 12/2012 | Chau et al. | |
| 8,347,394 B1 | 1/2013 | Lee | |
| 8,402,543 B1 | 3/2013 | Ranjan et al. | |
| 8,418,249 B1 | 4/2013 | Nucci et al. | |
| 8,484,377 B1 | 7/2013 | Chen et al. | |
| 8,516,585 B2 | 8/2013 | Cao et al. | |
| 8,527,592 B2 | 9/2013 | Gabe | |
| 8,578,497 B2 | 11/2013 | Antonakakis et al. | |
| 8,631,489 B2 | 1/2014 | Antonakakis et al. | |
| 8,667,583 B2 | 3/2014 | Polyakov et al. | |
| 8,826,438 B2 | 9/2014 | Perdisci et al. | |
| 8,832,829 B2* | 9/2014 | Manni .................. | G06F 21/566 726/22 |
| 8,869,269 B1 | 10/2014 | Ramzan et al. | |
| 8,893,273 B2* | 11/2014 | Honig .................. | G06F 21/554 713/189 |
| 9,306,969 B2 | 4/2016 | Dagon et al. | |
| 9,516,058 B2 | 12/2016 | Antonakakis et al. | |
| 9,525,699 B2 | 12/2016 | Antonakakis et al. | |
| 9,571,511 B2 | 2/2017 | Nelms et al. | |
| 2001/0014093 A1 | 8/2001 | Yoda et al. | |
| 2001/0044785 A1 | 11/2001 | Stolfo et al. | |
| 2001/0052007 A1 | 12/2001 | Shigezumi | |
| 2001/0052016 A1 | 12/2001 | Skene et al. | |
| 2001/0055299 A1 | 12/2001 | Kelly | |
| 2002/0021703 A1 | 2/2002 | Tsuchiya et al. | |
| 2002/0066034 A1 | 5/2002 | Schlossberg et al. | |
| 2002/0166063 A1 | 11/2002 | Lachman et al. | |
| 2002/0178238 A1 | 11/2002 | Fletcher | |
| 2003/0065926 A1 | 4/2003 | Schultz et al. | |
| 2003/0065943 A1 | 4/2003 | Geis et al. | |
| 2003/0069992 A1 | 4/2003 | Ramig | |
| 2003/0145233 A1 | 7/2003 | Poletto et al. | |
| 2003/0167308 A1 | 9/2003 | Schran | |
| 2003/0167402 A1 | 9/2003 | Stolfo et al. | |
| 2003/0204621 A1 | 10/2003 | Poletto et al. | |
| 2003/0236995 A1 | 12/2003 | Fretwell, Jr. | |
| 2004/0002903 A1 | 1/2004 | Stolfo et al. | |
| 2004/0039798 A1 | 2/2004 | Hotz et al. | |
| 2004/0044791 A1 | 3/2004 | Pouzzner | |
| 2004/0088346 A1 | 5/2004 | Yeager | |
| 2004/0088348 A1 | 5/2004 | Yeager | |
| 2004/0111636 A1 | 6/2004 | Baffes et al. | |
| 2004/0181687 A1 | 9/2004 | Nachenberg et al. | |
| 2004/0187032 A1 | 9/2004 | Geis et al. | |
| 2004/0205474 A1 | 10/2004 | Eskin et al. | |
| 2004/0215972 A1 | 10/2004 | Sung et al. | |
| 2005/0021848 A1 | 1/2005 | Jorgenson | |
| 2005/0036501 A1 | 2/2005 | Chung et al. | |
| 2005/0039019 A1 | 2/2005 | Delany | |
| 2005/0044406 A1 | 2/2005 | Stute | |
| 2005/0050377 A1 | 3/2005 | Chan et al. | |
| 2005/0060643 A1 | 3/2005 | Glass et al. | |

(56) References Cited

U.S. PATENT DOCUMENTS

| | | |
|---|---|---|
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0210534 A1 | 9/2005 | Krishnamurthy |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1 | 12/2005 | Cho et al. |
| 2005/0281291 A1 | 12/2005 | Stolfo et al. |
| 2006/0015630 A1 | 1/2006 | Stolfo et al. |
| 2006/0015722 A1 | 1/2006 | Rowan et al. |
| 2006/0026682 A1 | 2/2006 | Zakas |
| 2006/0031483 A1 | 2/2006 | Lund et al. |
| 2006/0067240 A1 | 3/2006 | Kim et al. |
| 2006/0068806 A1 | 3/2006 | Nam |
| 2006/0075084 A1 | 4/2006 | Lyon |
| 2006/0075494 A1 | 4/2006 | Bertman et al. |
| 2006/0078096 A1 | 4/2006 | Poyhonen |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0174345 A1 | 8/2006 | Flanagan et al. |
| 2006/0176822 A1 | 8/2006 | Doyle et al. |
| 2006/0178994 A1 | 8/2006 | Stolfo et al. |
| 2006/0200539 A1 | 9/2006 | Kappler et al. |
| 2006/0212925 A1 | 9/2006 | Shull |
| 2006/0212942 A1 | 9/2006 | Barford et al. |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon et al. |
| 2006/0253584 A1 | 11/2006 | Dixon |
| 2006/0259967 A1 | 11/2006 | Thomas et al. |
| 2006/0265436 A1 | 11/2006 | Edmond |
| 2006/0288415 A1 | 12/2006 | Wong |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1 | 5/2007 | Rand et al. |
| 2007/0136455 A1 | 6/2007 | Lee et al. |
| 2007/0162587 A1 | 7/2007 | Lund et al. |
| 2007/0198679 A1 | 8/2007 | Duyanovich et al. |
| 2007/0209074 A1 | 9/2007 | Coffman |
| 2007/0239999 A1 | 10/2007 | Honig et al. |
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1* | 1/2008 | Capalik ............... H04L 63/1408 726/23 |
| 2008/0028073 A1 | 1/2008 | Trabe et al. |
| 2008/0028463 A1 | 1/2008 | Dagon |
| 2008/0060054 A1 | 3/2008 | Srivastava |
| 2008/0060071 A1 | 3/2008 | Hennan et al. |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0201779 A1 | 8/2008 | Tahan et al. |
| 2008/0222729 A1 | 9/2008 | Chen et al. |
| 2008/0229415 A1 | 9/2008 | Kapoor et al. |
| 2008/0262985 A1 | 10/2008 | Cretu et al. |
| 2008/0263659 A1 | 10/2008 | Alme |
| 2008/0276111 A1 | 11/2008 | Jacoby et al. |
| 2009/0055929 A1 | 2/2009 | Lee et al. |
| 2009/0083855 A1 | 3/2009 | Apap et al. |
| 2009/0106304 A1 | 4/2009 | Song et al. |
| 2009/0138590 A1 | 5/2009 | Lee et al. |
| 2009/0171871 A1 | 7/2009 | Zhang et al. |
| 2009/0193293 A1* | 7/2009 | Stolfo .................. G06F 21/564 714/26 |
| 2009/0193497 A1 | 7/2009 | Kikuchi et al. |
| 2009/0198997 A1 | 8/2009 | Yeap et al. |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako et al. |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0043047 A1 | 2/2010 | Archer et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1 | 3/2010 | Bauschert et al. |
| 2010/0074112 A1 | 3/2010 | Derr et al. |
| 2010/0077481 A1 | 3/2010 | Polyakov et al. |
| 2010/0077483 A1 | 3/2010 | Stolfo et al. |
| 2010/0082758 A1 | 4/2010 | Golan |
| 2010/0138919 A1 | 6/2010 | Peng et al. |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt et al. |
| 2010/0332680 A1 | 12/2010 | Anderson et al. |
| 2011/0040706 A1 | 2/2011 | Sen et al. |
| 2011/0041179 A1 | 2/2011 | Stahlberg |
| 2011/0055123 A1* | 3/2011 | Kennedy ............... G06N 99/005 706/12 |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2011/0225644 A1 | 9/2011 | Pullikottil et al. |
| 2011/0283361 A1 | 11/2011 | Perdisci et al. |
| 2012/0079101 A1 | 3/2012 | Muppala |
| 2012/0084860 A1 | 4/2012 | Cao et al. |
| 2012/0102568 A1 | 4/2012 | Tarbotton |
| 2012/0117641 A1 | 5/2012 | Holloway et al. |
| 2012/0143650 A1 | 6/2012 | Crowley et al. |
| 2012/0151585 A1* | 6/2012 | Lamastra ............... H04L 51/12 726/24 |
| 2012/0198549 A1 | 8/2012 | Antonakakis et al. |
| 2012/0215909 A1 | 8/2012 | Goldfarb et al. |
| 2013/0054802 A1 | 2/2013 | Donzis et al. |
| 2013/0174253 A1 | 7/2013 | Thomas et al. |
| 2013/0191915 A1 | 7/2013 | Antonakakis et al. |
| 2013/0232574 A1 | 9/2013 | Carothers |
| 2014/0059216 A1 | 2/2014 | Jerrim |
| 2014/0068763 A1 | 3/2014 | Ward et al. |
| 2014/0068775 A1 | 3/2014 | Ward et al. |
| 2014/0074838 A1 | 3/2014 | Akoglu et al. |
| 2014/0075558 A1 | 3/2014 | Ward et al. |
| 2014/0090058 A1 | 3/2014 | Ward et al. |
| 2014/0157414 A1 | 6/2014 | Antonakakis et al. |
| 2014/0289854 A1 | 9/2014 | Mahvi |

(56) References Cited

U.S. PATENT DOCUMENTS

| | | | |
|---|---|---|---|
| 2014/0101759 | A1 | 12/2014 | Nelms et al. |
| 2014/0373148 | A1 | 12/2014 | Nelms et al. |
| 2015/0026808 | A1 | 1/2015 | Perdisci et al. |
| 2015/0222654 | A1 | 8/2015 | Crowley et al. |
| 2016/0156660 | A1 | 6/2016 | Dagon et al. |
| 2016/0285894 | A1 | 9/2016 | Nelms et al. |

OTHER PUBLICATIONS

Abad et al. "Log Correlation for Intrusion Detection: A Proof of Concept" (2003) In Proceedings of the 19$^{th}$ Annual Computer Security Application Conference (ACSAC'03) (11 pages).
Adamic et al. "Zipf's Law and the Internet" (2002) *Glottometrics* 3:143-150.
Akritidis et al. "Efficient Content-Based Detection of Zero-Day Worms" (May 2005) IEEE International Conference in Communications 2:837-843.
Alam et al. "Webinar: Intel Virtualization Technology of Embedded Applications" (2010) Intel (34 pages).
Alexa "Alexa Search—Beta" (retrieved from Internet Archive on May 23, 2013, Archived Sep. 25, 2006) http://www.alexa.com , pp. 1-3.
Alliance "Collaborative Malware Collection and Sensing" (retrieved from Internet Archive on May 23, 2013, Archived Jan. 7, 2007) https://alliance.mwcollect.org, pp. 1-2.
Anagnostakis et al. "Detecting Targeted Attacks Using Shadow Honeypots" (2005) Proceedings of the 14$^{th}$ USENIX Security Symposium pp. 129-144.
Anderson et al. "Spamscatter: Characterizing Internet Scam Hosting Infrastructure" (Aug. 6-10, 2007) Proceedings of the USENIX Security Symposium, Article 10 (14 pages).
Andrews "Negative Caching of DNS Queries (DNS NCACHE)" (Mar. 1998) http://tools.ietf.org/html.rfc2308 (20 pages).
Antonakakis e tal. "Building a Dynamic Reputation System for DNS" (Aug. 11-13, 2010) *19$^{th}$ USENIX Security Symposium*, Washington, DC (17 pages).
Antonakakis et al. "Detecting Malware Domains in the Upper DNS Hierarchy" (Aug. 8-12, 2011) *Proceedings of the 20$^{th}$ USENIX Security Symposium*, Washington, DC pp. 1-16.
Antonakakis et al. "From Throw-Away Traffic to Bots: Detecting the Rise of DGA-Based Malware" (2012) *Proceedings of the 21$^{st}$ USENIX Conference on Security Symposium*, Washington, DC (16 pages).
Antonakakis et al. "The Command Structure of the Aurora Bonet" (2010) http://www.damballa.com/downloads/r_pubs/Aurora_Botnet_Command_Structure.pdf (31 pages).
Antonakakis et al. "Unveiling the Network Criminal Infastructure of TDSS/TDL4" (undated) http://www.damballa.com/downloads/r_pubs/Damballa_tdss_td14_case_study_public.pdf (16 pages).
Anubis "Analyzing Unknown Binaries" ( retrieved from Internet Archive on May 23, 2013, Archived Apr. 9, 2008) http://anubis.seclab.tuwien.ac.at, pp. 1-2.
Arends et al. "DNS Security Introduction and Requirements" (Mar. 2005) http://www.ietf.org/rfc/rfc4033.txt (20 pages).
Arends et al. "Protocol Modifications for the DNS Security Extensions" (Mar. 2005) http://www.ietf.org/rfc/rfc4035.txt (50 pages).
Arends et al. "Resource Records for the DNS Security Extensions" (Mar. 2005) http://www.ietf.org/rfc/rfc4034.txt (20 pages).
Avira "More than security" (retrieved from Internet Archive on May 23, 2013, Archived Sep. 29, 2006) http://www.avira.com, pp. 1-13.
Axelsson "The Base-Rate Fallacy and the Difficulty of Intrusion Detection" (Aug. 2000) *ACM Transactions on Information and System Security* 3(3): 186-205.
Bacher et al. "Know Your Enemy: Tracking Botnets: Using Honeynets to Learn More About Bots" (Mar. 13, 2005) http://www.honeynet.org/papers/bots (8 pages).
Baecher et al. "The Nepenthes Platform: An Efficient Approach to Collect Malware" (Sep. 2006) Proceedings of Recent Advances in Intrusion Detection (RAID 2006) LNCS 4219, pp. 165-184.

Bailey et al. "Automated Classification and Analysis of Internet Malware" (Apr. 26, 2007) RAID 2007, LNCS 4637, pp. 178-197.
Barford et al. "An Inside Look at Botnets" (2006) Special Workshop on Malware Detection, Advances in Information Security, Spring Verlag, pp. 171-192.
Barham et al. "Xen and the Art of Virtualization" (Oct. 19-22, 2003) Proceedings of the 19$^{th}$ AMC Symposium (SOSP'03) pp. 164-177.
Bayer et al. "Scalable, Behavior-Based Malware Clustering" (Feb. 10, 2009) Network and Distributed System Security Symposium (18 pages).
Bayer et al. "TTAnalyze: A Tool for Analyzing Malware" (2006) Proceedings of the 15$^{th}$ Annual Conference European Institute for Computer Antivirus Research (EICAR), pp. 180-192.
Bellard "QEMU, A Fast and Portable Dynamic Translator" (2005) USENIX Annual Technical Conference, pp. 41-46.
Berger et al. "Assessing the Real-World Dynamics of DNS" (2012) *Lecture Notes in Computer Science* 7189:1-14.
Berk et al. "Using Sensor Networks and Data Fusion for Early Detection of Active Worms" (2003) Sensors, and Command, Control, Communications, and Intelligence (C3il) Technologies for Homeland Defense and Law Enforcement II, Proceedings of SPIE 5071:92-104.
Berners-Lee et al. "RFC3986—Uniform Resource Identifier (URI): Generic Syntax" (Jan. 2005) http://www.hjp.at/doc/rfc/rfc3986.html (62 pages).
Biles "Detecting the Unknown with Snort and Statistical Packet Anomaly Detecting Engine" (2003) www.cs.luc.edu/~pld/courses/447/sum08/class6/biles.spade.pdf pp. 1-9.
Bilge et al. "Exposure: Finding Malicious Domains Using Passive DNS Analysis" (Feb. 6-9, 2011) 18$^{th}$ Annual Network and Distributed System Security Symposium (17 pages).
Binkley et al. "An Algorithm for Anomaly-Based Botnet Detection" (Jul. 7, 2006) 2$^{nd}$ Workshop on Steps to Reducing Unwanted Traffic on the Internet (SRUTI '06), pp. 43-48.
Bishop "Computer Security: Art and Science" (2003) Addison-Wesley Longman Publishing, Boston, MA.
Bishop "Pattern Recognition and Machine Learning" (2006) Springer-Verlag New York, Inc., Secauscus, NJ.
Bleedingsnort "Bleeding Edge Snort" (retrieved from Internet Archive on May 23, 2013, Archived Sep. 26, 2006) http://www.bleedingsnort.com, pp. 1-3.
Borders et al. "Protecting Confidential Data on Personal Computers With Storage Capsules" (2009) 18$^{th}$ USENIX Security Symposium, pp. 367-382.
Borders et al. "Siren: Catching Evasive Malware (Short Paper)" (May 21-24, 2006) IEEE Symposium on Security and Privacy, pp. 78-85.
Breiman "Bagging Predictors" (1996) *Machine Learning* 24:123-140.
Brumley et al. "Automatically Identifying Trigger-Based Behavior in Malware: Botnet Detection" (2008) pp. 1-24.
Brumley et al. "Tracking Hackers on IRC" (Dec. 8, 1999) http://www.doomded.com/texts.ircmirc/TrackingHackersonIRC.com.htm pp. 24-29.
Caballero et al. "Measuring Pay-Per-Install: The Commoditization of Malware Distribution" (2011) Proceedings of the 20$^{th}$ USENIX Conference on Security (SEC'11) pp. 1-16.
Caballero et al. "Polyglot: Automatic Extraction of Protocol Message Format Using Dynamic Binary Analysis" (Oct. 2007) Proceedings of ACM Conference on Computer and Communication Security pp. 1-15.
Canavan "Symantec Security Response: W32.Bobax.D" (May 26, 2004) http://www.sarc.com/avcent/venc/data/w32.bobax.d.html, pp. 1-6.
Chang et al. "LIBSVM: A Library for Support Vector Machines" (Jun. 14, 2007) ACM Transactions on Intelligent Systems and Technology, pp. 1-26.
Cheung et al. "Modeling Multistep Cyber Attacks for Scenario Recognition" (Apr. 22-24, 2003) Proceedings of the Third DARPA Information Survivability Conference and Exposition (DISCEX III) 1:284-292.
Christodorescu et al. "Mining Specifications on Malicious Behavior" (Sep. 3-7, 2007) ESEC/FSE'07, pp. 1-10.

(56) References Cited

OTHER PUBLICATIONS

Christodorescu et al. "Semantics-Aware Malware Detection" (2005) In Proceedings of the 2005 IEEE Symposium on Security and Privacy, pp. 32-46.
Cipher Trust "Zombie Stats" (Mar. 25, 2009) http://www.ciphertrust.com/resources/statistics/zombie.php, pp. 1-3.
Collins et al. "Hit-List Worm Detection and Bot Identification in Large Networks Using Protocol Graphs" (2007) RAID 2007, LNCS 4637, pp. 276-295.
Common Vulnerabilities and Exposures "CVE-2006-3439" (Jun. 27, 2012) http://cve.mitre.org/cgi-bin/cvename.cgi?name=CVE-2006-3439, pp. 1-7.
Conficker Working Group "Conficker Working Group: Lessons Learned" (Jan. 2011) Conficker_Working_Group_Lessons_Learned_17_Jun_2010_final.pdf, pp. 1-59.
Cooke et al. "The Zombie Roundup: Understanding, Detecting, and Disrupting Botnets"(Jun. 2005) USENIX Workshop on Steps to Reducing Unwanted Traffic on the Internet (SRUTI '05), pp. 39-44.
Cristianini et al. "An Introduction to Support Vector Machines: and other Kernal-Based Learning Methods" (2000) Cambridge University Press, New York, NY, USA.
Cuppens et al. "Alert Correlation in a Cooperative Intrusion Detection Framework" (2002) Proceedings of IEEE Symposium on Security and Privacy 2002, pp. 202-215.
Cyber-Ta, http://cyber.ta.org/releases/botHunter/index.html, retrieved from Internet Archive on May 23, 2013, Archived Aug. 30, 2007, pp. 1-6.
Dagon et al. "Corrupted DNS Resolution Paths" The Rise of a Malicious Resolution Authority (2008) Proceedings of Network and Distributed Security Symposium (NDSS '08), pp. 1-15.
Dagon et al. "HoneyStat: Local Worm Detection Using Honeypots" (2004) RAID 2004, LNCS 3224, pp. 39-58.
Dagon et al. "Modeling Botnet Propagation Using Time Zones" (Feb. 2-3, 2006) The $13^{th}$ Annual Network and Distributed System Security Symposium 2006 (18 pages).
Dagon et al. "Worm Population Control Through Periodic Response" (Jun. 2004) Technical Report, Georgia Institute for Technology, pp. 1-12.
Daley et al. "Epidemic Modeling: An Introduction" (1999) Cambridge University Press, United Kingdom, pp. vii-ix, 7-15, and 27-38.
Damballa webpage (retrieved from Internet Archive on May 23, 2013, Archived Jan. 28, 2007) http://damballa.com, pp. 1-10.
Danchev "Leaked DIY Malware Generating Tool Spotted in the Wild" (Jan. 18, 2013) (6 pages) http://blog.webroot.com/2013/01/18/leaked-diy-malware-generating-tool-spotted-in-the-wild.
Danchev "Web Based Botnet Command and Control Kit 2.0" (Aug. 22, 2008) http://ddanchev.blogspot.com/2008/08/web-based-botnet-command-and-control.html, (5 pages).
De La Higuera et al. "Topology of Strings: Median String is NP-Complete" (2000) Theoretical Computer Science 230:39-48.
Diekmann et al. "Mathematical Epidemiology of Infectious Diseases: Model Building, Analysis and Interpretation" (2000) John Wiley & Son, Ltd., New York, NY, pp. v-xv and 1-303.
Dietrich et al. "Analyzing Distributed Denial of Service Tools: The Shaft Case" (Dec. 3-8, 2000) Proceedings of the $14^{th}$ Systems Administration Conference (LISA 2000), New Orleans, Louisiana, USA, pp. 329-339.
Dihe's IP-Index Browser (updated Oct. 13, 2012) http://ipindex.homelinux.net/index.php (1 page).
Dinaburg et al. "Ether: Malware Analysis Via Hardware Virtualization Extensions" (Oct. 27-31, 2008) CCS'08, pp. 1-12.
Dingledine et al. "Tor: The Second-Generation Onion Router" (Aug. 9-13, 2004) Proceedings of the $13^{th}$ USENIX Security Symposium, pp. 303-320.
Dittrich "Active Response Continuum Research Project" (Nov. 14, 2005) http://staff.washington.edu/dittrich/arc (4 pages).
DMOZ Open Directory Project, Dynamic DNS Providers List (Aug. 8, 2007) http://dmoz.org/Computers/Software/Internet/Servers/Address_Management/Dynamic_DNS_Services.

DNSWL "DNS Whitelist—Protection Against False Positives" (retrieved from Internet Archive on May 23, 2013, Archived Jul. 15, 2006) http://www.dnswl.org, pp. 1-4.
Dshield "Distributed Intrusion Detection System" (retrieved from Internet Archive on May 23, 2013, Archived Sep. 29, 2006) http://www.dshield.org, pp. 1-2.
Duda et al. "Pattern Classification, Second Edition" (2001) John Wiley & Sons, Inc., New York, NY, pp. vii-xx, and 1-654.
Dyninst "An application program interface (API) for runtime code generation" (retrieved from Internet Archive on May 23, 2013, Archived Aug. 20, 2006) http://www.dyninst.org, pp. 1-2.
Eckman et al. "STATL: An Attack Language for State-Based Intrusion Detection" (2002) *Journal of Computer Security* 10:71-103.
Edmonds "ISC Passive DNS Architecture" (Mar. 2012) http://kb.isc.org/getAttach/30/AA-00654/passive-dns-architecture pp. 1-18.
Egele et al. "A Survey on Automated Dynamic Malware-Analysis Techniques and Tools" (Feb. 2012) *ACM Computing Surveys* 44(2)(6):1-6:42.
Ellis et al. "A Behavioral Approach to Worm Detection" (Oct. 29, 2004) WORM'04, pp. 1-11.
Erdogan et al. "Hash-AV: Fast Virus Signature Matching by Cache-Resident Filters" (2007) *Int. I Secur. Netw.* 2:50-59.
Eris Free Network"Efnet Chat Network" (retrieved Dec. 27, 2016) http://www.efnet.org, pp. 1-3.
Falliere et al. "W32.Stuxnet Dossier" (Feb. 2011) http://www.symantec.com/content/en/us/enterprise/media/security_response/whitepapers/w32_stuxnet_dossier.pdf, Version 1.4:1-69.
Feldman et al. "The Text Mining Handbook: Advance Approaches in Analyzing Unstructured Data" (2007) Cambridge Univ. Press, New York, NY (TOC).
Felegyhazi et al. "On the Potential of Proactive Domain Blacklisting" (2010) Third USENIX LEET Workshop, pp. 1-8.
Ferrie "Anti-Unpacker Tricks" (2008) Proceedings of the $2^{nd}$ International CARO Workshop, pp. 1-25.
Ferrie "Attacks on More Virtual Machine Emulators" (2007) *Symantec Advance Threat Research*, http://pferric.tripod.com/papers/attacks2.pdf (17 pages).
Ferrie "Attacks on Virtual Machine Emulators" (2006) *Symantec Advance Threat Research* (13 pages).
Fisher "Thwarting the Zombies" (Mar. 31, 2003) pp. 1-2.
Fisher "Zeus Source Code Leaked" (May 10, 2011) http://threatpost.com/en_us/blogs/zeus-source-code-leaked-051011 (6 pages).
Fogla et al. "Polymorphic Blending Attacks" (2006) Proceedings of $15^{th}$ USENIX Security Symposium, pp. 241-256.
Freiling et al. "Botnet Tracking: Exploring a Root-Cause Methodology to Prevent Distributed Denial-of-Service Attacks" (2005) ESORICS 2005, LNCS 3679, pp. 319-335.
Fuller et al. "RFC 1519—Classless Inter-Domain Routing (CIDR): An Address Assignment and Aggregation Strategy" (Sep. 1993 ). http://www.faqs.org/rfcs/rfc1519.html pp. 1-30.
Garera et al. "A Framework for Detection and Measurement of Phishing Attacks" (Nov. 2, 2007) WORM'07, pp. 1-8.
Garfinkel et al. "A Virtual Machine Introspection Based Architecture for Intrusion Detection" (Feb. 2003) Proceedings of Network and Distributed Systems Security Symposium, pp. 1-16.
Geide "Another Trojan Barnital Pattern" (May 6, 2011) http://research.zscaler.com/2011/05/another-trojan-bamital-pattern.html pp. 1-5.
Gil "NSTX (IP-over-DNS) HOWTO" (Nov. 4, 2005) http://thomer.com/howtos/nstx.html pp. 1-5.
Glenn "A Summary of DoS/DdoS Prevention, Monitoring and Mitigation Techniques in a Service Provider Environment" (Aug. 21, 2003) *SANS Institute* 2003, pp. ii-iv, and 1-30.
Goebel "Rishi: Identify Bot Contaminated Hosts by IRC Nickname Evaluation" (Apr. 10, 2007) Hot Bots'07, pp. 1-12.
Gomes et al. "Characterizing a Spam Traffic" (Oct. 25-27, 2004) ACM SIGCOMM Internet Measurement Conference (IMC '04), Taormina, Sicily, Italy, pp. 356-369.
Gostev "Malware Evolution: Jan.-Mar. 2005" (Apr. 18, 2005) Viruslist.com http://www.viruslist.com/en/analysis?pubid=162454316, pp. 1-8.

(56) References Cited

OTHER PUBLICATIONS

Gu et al. "Bothunter: Detecting Malware Infection Through IDS-Driven Dialog Correlation" (2007) Slides from Proceedings of 16th USENIX Security Symposium.

Gu et al. "BotMiner: Clustering Analysis of Network Traffic Protocol- and-Structure-Independent Botnet Detection" (2008) USENIX Security Symposium, pp. 139-154.

Gu et al. "BotSniffer: Detecting Botnet Command and Control Channels in Network Traffic" (Feb. 2008) Proceedings of the 1th Annual Network and Distributed System Security Symposium (NDSS'08), pp. 1-18.

Gunderson "Global Ipv6 Statistics: Measuring the Current State of Ipv6 for Ordinary Users" (Oct. 24-30, 2008) http://meetings.ripe.net/ripe-57/presentations/Colitti-Global_Ipv6_statistics_-_Measuring_the_current_state_of_Ipv6_for_ordinary_users_.7gzD.pdf (slides 20 pages).

Guo et al. "A Study of the Packer Problem and Its Solutions" (2008) Recent Advances in Intrusion Detection (RAID 2008), LNCS 5230, pp. 95-115.

Halkidi et al. "On Clustering Validation Techniques" (2001) *Journal of Intelligent Information Systems* 17:107-145.

Handlers (jclausing) (printed May 24, 2013) http://handlers.sans.org/jclausing/userdb.txt, pp. 1-149.

Hanna "Using Snort to Detect Rogue IRC Bot Programs" (Oct. 8, 2004) Technical Report, SANS Institute 2004, pp. 1-17.

Hao et al. "An Internet-Wide View into DNS Lookup Patterns" (2010) http://labs.verisign.com/projects/malicious-domain-names/white-paper/dns-imc2010.pdf, pp. 1-6.

Hao et al. "Detecting Spammers with Snare: Spatiotemporal Network-Level Automatic Reputation Engine" (2009) 18th USENIX Security Symposium, pp. 101-117.

Hardin "The Scanner Tarpit HOWTO" (Jul. 20, 2002) http://www.impsec.org/linus/security/scanner-tarpit.html, Intro and TOC.

Heinz et al. "IP Tunneling Through Nameserver" (Sep. 10, 2000) http://slahdot.org/story/00/09/10/2230242/ip-tunneling-through-nameservers, pp. 1-23.

Higgins "Hacking a New DNS Attack: DNS Expert Disputes Georgia Tech and Google Research That Points to Malicious Deployment of Certain Types of DNS Servers" (Dec. 18, 2007) http://darkreading.com/taxonomy/index/printarticle/id/208803784, (2 pages).

Higgins "Shadowserver to Build 'Sinkhole' Server to Find Errant Bots: New Initiative Will Emulate IRC, HTTP Botnet Traffic" (Sep. 24, 2008) http://darkreading.com/taxonomy/index/printarticle/id/211201241, (1 page).

Hindocha et al. "Malicious Threats and Vulnerabilities in Instant Messaging" (Sep. 2003) Virus Bulletin International Conference, pp. 1-24.

Holz "Anti-Honeypot Technology" (Dec. 2004) 21st Chaos Communication Congress, slides 1-57.

Holz et al. "A Short Visit to the Bot Zoo" (2005) IEEE Security & Privacy, pp. 76-79.

Holz et al. "Measuring and Detecting Fast-Flux Service Networks" (2008) Proceedings of NDSS (12 pages).

Honeynet Project & Research Alliance "Know Your Enemy: Fast-Flux Service Networks: An Ever Changing Enemy" (Jul. 13, 2007) http://old.honeynet.org/papers/ff/fast-flux.html, pp. 1-10.

Honeynets "Know Your Enemy: Honeynets" (May 31, 2006) http://www.honeypot.org/papers/honeynet, pp. 1-5.

Hothorn et al. "Double-Bagging: Combining Classifiers by Bootstrap Aggregation" (2003) *Pattern Recognition* 36:1303-1309.

Hund et al. "Return-Oriented Rootkits: Bypassing Kernel Code Integrity Protection Mechanisms" (2009) 18th USENIX Security Symposium, pp. 383-398.

Hunt et al. "Detours: Binary Interception of WIN32 Functions" (Jul. 12-13, 1999) Proceedings of the 3rd USENIX Windows NT Symposium, pp. 1-9.

Icann "Who is Privacy" (Jun. 3, 2005) www.gnso.icann.org/issues/whois-privacy/index/shtml.

Ilgun et al. "State Transition Analysis: A Rule-Based Intrusion Detection Approach" (Mar. 1995) IEEE Transactions on Software Engineering 21(3):181-199.

International Preliminary Report on Patentability for International Patent Application No. PCT/US2006/038611 dated Mar. 26, 2009.

International Search Report and Written Opinion for International Patent Application No. PCT/US2006/038611 dated Jul. 8, 2008.

Ishibashi e tal. "Detecting Mass-Mailing Worm Infected Hosts by Mining DNS Traffic Data" (Aug. 22-26, 2005) SIGCOMM''05 Workshops, pp. 159-164.

Jacob "Jackstraws: Picking Command and Control Connections from Bot Traffic" (2011) Proceedings of the 20th USENIX Conference on Security (SEC'11), pp. 1-16.

Jain et al. "Algorithms for Clustering Data" (1988) Prentice-Hall, Inc., Englewood Cliffs, NJ.

Jain et al. "Data Clustering: A Review" (Sep. 1999) ACM Computing Surveys 31(3):264-323.

Jang et al. "Bitshred: Feature Hashing Malware for Scalable Triage and Semantic Analysis" (Oct. 17-21, 2011) Proceedings of the 18th ACM Conference on Computer and Communications Security (CCS' 11), pp. 309-320.

Jiang et al. "Cerias Tech Report 2005-24: Virtual Playgrounds for Worm Behavior Investigation" (Feb. 2005) Purdue University, West Lafayette, IN, pp. 1-16.

Jiang et al. "Identifying Suspicious Activities Through DNS Failure Graph Anaylsis" (2010) 18th IEEE International Conference on Network Protocols (ICNP' 10) Washington, DC, pp. 144-153.

Jiang et al. "Profiling Self-Propagating Worms Via Behavioral Footprinting" (Nov. 3, 2006) WORM'06 (7 pages).

Jiang et al. "Stealthy Malware Detection Through VMM-Based" (Oct. 29-Nov. 2, 2007) Out-of-the-Box Semantic View Reconstruction, CCS'07 (11 pages).

Jiang et al. "Virtual Playgrounds for Worm Behavior Investigation" (2006) RAID 2005, LNCS 3858 (15 pages).

John et al. "Studying Spamming Botnets Using Botlab" (2009) USENIX Symposium on Networked Systems Design and Implementation (NDSI), pp. 1-15.

Jones et al. "The IPM Model of Computer Virus Management" (1990) *Computers & Security* 9:411-418.

Jung "Fast Portscan Detection Using Sequential Hypothesis Testing" (2004) IEEE Symposium on Security Privacy, pp. 211-225.

Jung et al. "An Empirical Study of Spam Traffic and the Use of DNS Black Lists" (Oct. 25-27, 2004) ACM SIGCOMM Internet Measurement Conference (ICM '04), Taormina, Sicily, Italy, pp. 370-375.

Jung et al. "DNS Performance and the Effectiveness of Caching" (Oct. 2002) IEEE/ACM Transactions on Networking 10(5):589-603.

Jung et al. "Modeling TTL-Based Internet Caches" (Mar. 2003) IEEE INFOCOM 2003, pp. 417-426.

Kalt "RFC 2810—Internet Relay Chat: Architecture" (Apr. 2000) http://faqs.org/rfcs/rfc2810.html, pp. 1-12.

Kandula et al. "Botz-4-Sale: Surviving Organized DdoS Attacks That Mimic Flash Crowds" (2004) Technical Report LCS TR-969, Laboratory for Computer Science, MIT, pp. 1-14.

Kang et al. "Renovo: A Hidden Code Extract for Packed Executables" (Nov. 2, 2007) WORM'07, pp. 1-8.

Karasaridis et al. "Wide-Scale Botnet Detection and Characterization" (Apr. 11-13, 2007) USENIX Workshop on Hot Topics in Understanding Botnets, HotBots'07, pp. 1-8.

Kaspersky Lab's Global Research & Analysis Team (GreAT), "Full Analysis of Flame's Command & Control Servers" (Sep. 17, 2012) http://www.securelist.com/en/blog/750/Full_Analysis_of_Flames_Command_Control_Servers, pp. 1-19.

Kephart et al. "Directed-Graph Epidemiological Models of Computer Viruses" (1991) IEEE Symposium on Security and Privacy, pp. 343-359.

Kienzle et al. "Recent Worms: A Survey and Trends" (Oct. 27, 2003) In WORM '03 ACM Workshop on Rapid Malcode, Washington, DC, USA, pp. 1-10.

Kim et al. "Autograph: Toward Automated, Distributed Worm Signature Detection" (2004) USENIX Security Symposium, pp. 1-22.

(56) References Cited

OTHER PUBLICATIONS

Kim et al. "Measurement and Analysis of Worm Propagation on Internet Network Topology" (2004) IEEE, pp. 495-500.
Kim et al. "Request Rate Adaptive Dispatching Architecture for Scalable Internet Server" (2000) IEEE International Conference on Cluster Computing (CLUSTER'00); pp. 289-296.
Kivity et al. "KVM: The Linux Virtual Machine Monitor" (Jun. 27-30, 2007) Linux Symposium, pp. 225-230.
Kolbitsch et al. "Effective and Efficient Malware Detection at the End Host" (2009) $18^{th}$ USENIX Security Symposium, pp. 351-366.
Kolter et al. "Learning to Detect and Classify Malicious Executables in the Wild" (Dec. 2006) *Journal of Machine Learning Research* 7:2721-2744.
Krasser et al. "Real-Time and Forensic Network Data Analysis Using Animated and Coordinated Visualization" (Jun. 2005) $6^{th}$ IEEE Information Assurance Workshop, pp. 1-8.
Krebs "Bringing Botnets Out of the Shadows" (Mar. 21, 2006) Washingtonpost.com, http://www.washingtonpost.com/wp-dyn/content/article/2006/03/21/AR2006032100279_pf.html, pp. 1-4.
Krebs "Ecological Methodology" (1989) Harper & Row, Publishers, New York, pp. v-x, 15-37, 155-166, and 190-194.
Kreibich "Honeycomb: Automated NIDS Signature Creation Using Honeypots" (2003) http://www.cl.cam.ac.uk/research/srg/netos/papers/2003-honeycomb-signcomm-poster.pdf (1 page).
Kreibich "Honeycomb: Automated Signature Creation Using Honeypots" (Mar. 26, 2007) http://www.icir.org/christian/honeycomb/index.html (3 pages).
Kreibich et al. "Honeycomb—Creating Intrusion Detection Signatures Using Honeypots" (2003) ACM Workshop on Hot Topics in Networks (6 pages).
Krishnan et al. "DNS Prefetching and Its Privacy Implications: When Good Things Go Bad" (2010) $3^{rd}$ USENIX Conference on Large-Scale Exploits and Emergent Threats: Botnets, Spyware, Worms, and More (LEET'10), pp. 1-9.
Kruegel et al. "Anomaly Detection of Web-Based Attacks" (Oct. 27-31, 2003) $10^{th}$ ACM Conference on Computer and Communication Security (CCS '03), Washington, DC, USA, pp. 251-261.
Kruegel et al. "Detecting Kernel-Level Rootkits Through Binary Analysis" (Dec. 2004) Annual Computer Security Applications Conference (ACSAC), pp. 91-100.
Kruegel et al. "Polymorphic Worm Detection Using Structural Information of Executables" (2005) RAID 2005, pp. 207-226.
Krzywinski "Port Knocking—Network Authentication Across Closed Ports" (2003) *Sys Admin Magazine* 12:12-17.
Landwehr et al. "Logistic Model Trees" (2005) *Machine Learning* 59:161-205.
Laurikari "TRE" (Jul. 22, 2006) https://github.com/laurikari/tre/blob/master/tre.spec, pp. 1-3.
Li et al. "Hamsa: Fast Signature Generational for Zero-Day Polymorphic Worms with Provable Attack Resilience" (2006) IEEE Symposium on Security and Privacy, pp. 1-15.
Ligh et al. "Malware Analyst's Cookbook and DVD" (2010) Wiley Publishing, Indianapolis, IN.
Liston "Welcome to my Tarpit: The Tactical and Strategic Use of LaBrea" (Oct. 24, 2001) http://www.hackbusters.net/LaBrea/LaBrea.txt, pp. 1-4.
Livades et al. "Using Machine Learning Techniques to Identify Botnet Traffic" (2006) $2^{nd}$ IEEE LCN Workshop on Network Security (WoNS '2006), pp. 967-974.
Lockdown Corp. "LockDown Security Bulletin—Sep. 23, 2001", http://lockdowncorp.com/bots, pp. 1-8.
LURHQ Threat Intelligence Group "Dabber Worm Analysis" (May 13, 2004) http://www.lurhq.com/dabber.html, pp. 1-4.
Ma "NetGeo—The Internet Geographic Database" (Sep. 6, 2006) http://www.caida.org/tools/utilities/netgeo/index.xml, pp. 1-2.
Malware Domains "DNS—BH Malware List" (retrieved from Internet Archive on May 23, 2013, Archived Dec. 28, 2007) httpa://malwaredomains.com, pp. 1-12.
Mao et al. "A Precise and Efficient Evaluation of the Proximity Between Web Clients and Their Local DNS Servers" (2002) USENIX Annual Technical Conference, pp. 1-14.
Martignoni et al. "OmniUnpack: Fast, Generic, and Safe Unpacking of Malware" (2007) Annual Computer Security Applicatoins Conference (ACSAC), pp. 431-441.
Marx "Outbreak Response Times: Putting AV to the Test" (Feb. 2004) www.virusbtn.com, pp. 4-6.
MathWorks Inc. "Simulink—Simulation and Model-Based Design" (Dec. 31, 2005) http://www.mathworks.com/products/simulink, pp. 1-2.
McAfee "About McAfee Security" (printed May 23, 2013) http://www.mcafee.com/us, pp. 1-23.
McCarty "Botnets: Big and Bigger" (2003) IEEE Security and Privacy Magazine 1:87-89.
Mekky et al. "Detecting Malicious HTTP Redirections Using Trees of User Browser Activity" (2014) *IEEE INFOCOM* 2014, pp. 1159-1167.
Microsoft Encyclopedia "Trojan: Java/Boonan" (last published Apr. 16, 2011) http://microsoft.com/security/portal/threat/encyclopedia/entry.apsx?Name=Trojan%3Ajava%2Fboonan, pp. 1-2.
Mirkovic et al. "Internet Denial of Service: Attack and Defense Mechanisms" (2004) Prentice Hall Professional Technical Reference, pp. v-xxii and 1-372.
Mockapetris "Domain Names—Concepts and Facilities" (Nov. 1987) Network Working Group, http://www.ietf.org/rfc/rfc1034.txt, pp. 1-52.
Mockapetris "Domain Names—Implementation and Specification" (Nov. 1987) Network Working Group, http://www.ietf.org/rfc.rfc1035.txt, pp. 1-52.
Moore "Inferring Internet Denial-of-Service Activity" (Aug. 13-17, 2001) $10^{th}$ USENIX Security Symposium, pp. 1-14.
Moore "Network Telescopes: Observing Small or Distant Security Events" (Aug. 8, 2002) http://www.caida.org/publications/presentations/2002/usenix_sec/usenix_sec_2002_files/frame.htm, pp. 1-64.
Moore et al. "Code-Red: A Case Study on the Spread and Victims of an Internet Worm" (2002) http://www.icir.org/vern/imw-2002/imw2002-papers/209.ps/gz, pp. 1-12.
Moore et al. "Internet Quarantine: Requirements for Containing Self-Propagating Code" (Mar. 2003)IEEE INFOCOM 2003, pp. 1-10.
Moore et al. "Slammer Worm Dissection: Inside the Slammer Worm" (Jul.-Aug. 2003) IEEE Security & Privacy 1(4):33-39.
Mozilla Foundation "Public Suffix List" (printed May 23, 2013) http://publicsuffix.org/, pp. 1-8.
Newman "Networks: An Introduction" (Sep. 2010) Oxford University Press (TOC).
Newsome et al. "Paragraph: Thwarting Signature Learning by Training Maliciously" (2005) Recent Advance in Intrusion Detection (RAID), pp. 1-21.
Newsome et al. "Polygraph: Automatically Generating Signatures for Polymorphic Worms" (2005) IEEE Symposium on Security and Privacy (16 pages).
Ning et al. "Constructing Attack Scenarios Through Correlation of Intrusion Alerts" (Nov. 18-22, 2002) Computer and Communications Security (CCS'02), pp. 1-10.
Norman "Norman Sandbox Whitepaper", Copyright Norman 2003, pp. 1-19.
Oarci Website Development Group (retrieved from Internet Archive on Apr. 11, 2014, Archived Apr. 12, 2008) http://malfease.oarci.net, pp. 1-9.
Oberheide et al. "CloudAV: N-Version Antivirus in the Network Cloud" (2008) $17^{th}$ USENIX Security Symposium, pp. 91-106.
OpenDNS "OpenDNS Makes Your Internet Work Better" (retrieved from Internet Archive on May 23, 2013, Archived Sep. 9, 2006) http://www.opendns.com, pp. 1-25.
Oreans "Understanding the Risks"( retrieved from Internet Archive on May 23, 2013, Archived Aug. 23, 2006) http://www.oreans.com/themida.php, pp. 1-12.
Overton "Bots and Botnets: Risks, Issues and Prevention" (Oct. 5-7, 2005) 2005 Virus Bulletin Conference at the Burlington, Dublin, Ireland, http://arachnid.homeip.net/papers/VB2005-Bots_and_Botnets-1.0.2.pdf, pp. 1-28.

(56) References Cited

OTHER PUBLICATIONS

Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.
Paxson "Bro: A System for Detecting Network Intruders in Real-Time" (Jan. 26-29, 1998) $7^{th}$ USENIX Security Symposium, pp. 1-22.
PEID "PEID detects most common packers, cryptors and compliers for PE files" (retrieved from Internet Archive on May 23, 2013, Archived Dec. 4, 2007) http://www.peid.info, pp. 1-2.
Pelleg et al. "X-Means: Extending K-Means with Efficient Estimation of the Number of Clusters" (2000 International Conference on Machine Learning, pp. 1-8.
Perdisci et al. "Behavioral Clustering of HTTP-Based Malware and Signature Generation Using Malicious Network Traces" (2010) USENIX Symposium on Networked Systems Design and Implementation (NSDI 2010), pp. 1-16.
Perdisci et al. "Detecting Malicious Flux Service Networks Through Passive Analysis of Recursive DNS Traces" (2009) ACSAC, Honolulu, Hawaii, USA (10 pages).
Perdisci et al. "Misleading Worm Signature Generators Using Deliberate Noise Injection" (2006) IEEE Symposium on Security and Privacy (15 pages).
Perdisci et al. "Using an Ensemble of One-Class SVM Classifiers to Harden Payload-Based Anomaly Detection Systems" (Dec. 2006) $6^{th}$ International Conference on Data Mining (ICDM'06), pp. 488-498.
Perigaud "New Pill?" (Mar. 21, 2008) http://cert.lexsi.com/weblog/index.php/2008/03/21/223-new-pill, pp. 1-3.
Platt "Probablistic Outputs for Support Vector Machines and Comparisons to Regularized Likelihood Methods" (Mar. 26, 1999) *Advances in Large Margin Classifiers* 10(3):61-74.
Plonka et al. "Context-Aware Clustering of DNS Query Traffic" (2008) $8^{th}$ IMC, pp. 1-13.
Pointer "Eggdrop Development" (Oct. 1, 2005) http://www.eggheads.org, pp. 1-2.
Porras "Inside Risks: Reflections on Conficker" (Oct. 2009) *Communications of the ACM* 52(10):23-24.
Porras et al. "SRI International Technical Report: Conficker C Analysis" (Apr. 4, 2009) http://mtc.sri.com/Conficker/addendumC, pp. 1-24.
Porras et al. "SRI International Technical Report: An Analysis of Conficker's Logic and Rendezvous Points" (Mar. 19, 2009) http://mtc.sri.com/Conficker, (31 pages).
Provos "CITI Technical Report 03-1: A Virtual Honeypot Framework" (Oct. 21, 2003) http://www.citi.umich.edu/techreports/reports/citi-tr-03-1.pdf, pp. 1-12.
Provos et al. "Virtual Honeypots: Form Botnet Tracking to Intrusion Detection" (2007) Addison-Wesley Professional (TOC).
Ptacek "Side-Channel Detection Attacks Against Unauthorized Hyervisors" (Aug. 20, 2007) http://www.matasano.com/log/930/side-channel-detection-attacks-against-unauthorized-hypevisors, retrieved from Internet Archive on May 23, 2013, pp. 1-12.
Puri "Bots & Botnet: An Overview" (Aug. 8, 2003) SANS Institute 2003 http://222.giac.com/practical/GSEC/Ramneek_Puri_GSEC.pdf, pp. 1-16.
Qian et al. "On Network-Level Clusters for Spam Detection" (2010) USENIX NDSS Symposium, pp. 1-17.
Qin et al. "Worm Detection Using Local Networks" (Feb. 2004) Technical Report GIT-CC-04-04, College of Computing, Georgia Institute of Technology, pp. 1-18.
Quist "Covert Debugging Circumventing Software Armoring Techniques" (2007) Black Hat USA, pp. 1-5.
R Developmental Core Team "R: A Language and Environment for Statistical Computing" (2008) R. Foundation for Statistical Computing, Vienna, Austria.
Racine "Master's Thesis: Analysis for Internet Relay Chat Usage by DDoS Zombies" (Nov. 3, 2003) ftp://www.tik.ee.ethz.ch/pub/students/2003-2004-Wi/MA-2004-01.pdf, pp. 1-4.
Raffetseder et al. "Detecting System Emulators" (2007) ISC, pp. 1-18.
Rajab et al. "A Multifaceted Approach to Understanding the Botnet Phenomenon" (Oct. 25-27, 2006) ACM SIGCOMM/USENIX Internet Measurement Conference (ICM'06), 12 pages.
Rajab et al. "On the Effectiveness of Distributed Worm Monitoring" (2005) $14^{th}$ USENIX Security Symposium, pp. 1-13.
Ramachandran et al. "Understanding the Network-Level Behavior of Spammers" (Sep. 11-16, 2006) 2006 Conference on Applications, Technologies, Architectures, and Protocols for Computer Communications (SIGCOMM'06), Pisa, Italy, pp. 291-302.
Rieck et al. "Learning and Classification of Malware Behavior" (2008) DIMVA 2008, LNCS 5137, pp. 108-125.
Roberts "Trend Micro Launches Anti-Botnet Service" (Sep. 25, 2006) InfoWorld http://www.infoworld.com/article/06/09/25/HNtrendintercloud_1.html, pp. 1-4.
Roesch "SNORT—Lightweight Intrusion Detection for Networks" (Nov. 7-12, 1999) $13^{th}$ System Administration Conference (LISA'99), pp. 229-238.
Royal "Alternative Medicine: The Malware Analyst's Blue Pill" (2008) www.damballa.com/downloads/r_pubs/KrakenWhitepaper.pdf (3 pages).
Royal "Alternative Medicine: The Malware Analyst's Blue Pill" (Aug. 6, 2008) Black Hat USA, pp. 1-33.
Royal "Analysis of the Kracken Botnet" (Apr. 9, 2008) (13 pages).
Royal et al. "PolyUnpack: Automating the Hidden-Code Extraction of Unpack-Executing Malware" (2006) Annual Computer Security Applications Conference (ACSAC), pp. 289-300.
RSA Fraudaction Research Labs, "Anatomy of an Attack" (Apr. 1, 2011) http://blogs.rsa.com/rivner/anatomy-of-an-attack, pp. 1-17.
Russinovich et al. "FileMon for Windows V7.04" (Nov. 1, 2006) http://technet.microsoft.com/en-us/sysinternals/bb896642.aspx. (6 pages).
Russinovich et al. "RegMon for Windows V7.04" (Nov. 1, 2006) http://technet.microsoft.com/en-us-sysinternals/bb896652.apsx, (4 pages).
Rutkowska "Introducing Blue Pill" (Jun. 22, 2006) http://theinvisiblethings.blogspot.com/2006/06/introducing-blue-pill.html, pp. 1-26.
Sato et al. "Extending Black Domain Name List by Using Co-Occurrence Relation Between DNS Queries" (2010) The Third USENIX LEET Workshop, pp. 1-22.
Saydjari "Privacy-Enabled Global Threat Monitoring" (2006) IEEE Security & Privacy, pp. 60-63.
Schechter et al. "Access for Sale: A New Class of Worm" (Oct. 27, 2003) ACM Workshop on Rapid Malcode (WORM '03), ACM SIGSAC, Washington, DC, USA, pp. 1-5.
Shannon et al, "The Spread of the Witty Worm" (Mar. 19, 2004) http://www.caida.org/analysis/security/witty/index.xml, pp. 1-7.
Sharif "Mechanisms of Dynamic Analysis and DSTRACE" pp. 1-10.
Shevchenko "Domain Name Generator for Murofet" (Oct. 14, 2010) http://blog.threatexpert.com/2010/10/domain-name-generator-for-murofet.html, pp. 1-4.
Shevchenko "Srizbi's Domain Calculator" (Nov. 28, 2008) http://blog.threatexpert.com/2008/11/srizbix-domain-calculator.html (3 pages).
SIE ISC "ISC—Internet Systems Consortium" (retrieved from Internet Archive on May 23, 2013, Archived Dec. 29, 2008) https://sie.isc.org, pp. 1-2.
Sieberg "Expert: Botnets No. 1 Emerging Internet Threat" (Jan. 31, 2006), CNN.com, CNN Technology News, http://www.cnn.com/2006/TECH/internet/01/31/furst/index.html, pp. 1-4.
Siliconrealms "Silicon Realms Toolworks" (retrieved from Internet Archive on May 23, 2013, Archived Sep. 4, 2006) http://www.siliconrealms.com, pp. 1-12.
Singh "IRC Reconnaissance" (Jul. 24, 2006) (IRCRecon) Public IRC Heuristics (BotSniffer), pp. 1-3.
Singh et al. "Automated Worm Fingerprinting" (Dec. 2004) ACM/USENIX Symposium System Design and Implementation (16 pages).
Sinha et al. "Shades of Grey: On the Effectiveness of Reputation-Based Blacklists" (2008) $3^{rd}$ International Conference on MALWARE, pp. 1-8.

(56) References Cited

OTHER PUBLICATIONS

Sipser "Introduction to the Theory of Computation" (1996) International Thomson Publishing, Boston, MA.
Sirainen "IRSSI" (updated May 8, 2013) http://en.wikipedia.org/wiki/Irssi, pp. 1-3.
Smith "Dynamic DNS" (Aug. 7, 2006), providers list, http://www.technopagan.org/dynamic, pp. 1-24.
Sommer et al. "Enhancing Byte-Level Network Intrusion Detection Signatures with Context" (Oct. 27-30, 2003) $10^{th}$ ACM Conference on Computer and Communications Security CCS'03), pp. 262-271.
Sophos "W32/IRCBot-TO" (published Nov. 10, 2010) http://www.sophos.com/virusinfo/analyses.w32ircbotto.html, pp. 1-2.
Souders "Sharding Dominant Domains" (May 12, 2009) http://www.stevesouders.com/blog/2009/05/12/sharding-dominant-domains, pp. 1-3.
Soumenkov et al. "TDL4—Top Bot" (Jun. 27, 2011) http://www.secuirlist.com/en/analysis/204792180/td14_top_bot pp. 1-18.
Spamhaus (2013), http://www.spamhaus.org/sbl, retrieved from Internet Archive on May 23, 2013, Archived Sep. 24, 2006 (24 pages).
Spamhaus (2016), http://www.spamhaus.org/zen/, retrieved from Internet Archive on Mar. 16, 2016, Archived Jul. 6, 2010 (3 pages).
Spitzner "Honeypots: Tracking Hackers" (2003) Addison-Wesley, pp. vii-xiv, 73-139, 141-166, and 229-276.
Staniford "Code Red Analysis Pages: July Infestation Analysis" (Nov. 18, 2001) http://silicondefense.org/cr/july.html, pp. 1-8.
Staniford "How to Own the Internet in Your Spare Time" (Aug. 2002) $11^{th}$ USENIX Security Symposium, San Francisco, CA (19 pages).
Staniford et al. "Practical Automated Detection of Stealthy Portscans" (2002) *Journal of Computer Security* 10:105-136.
Staniford-Chen et al. "GrIDS-A Graph Based Intrusion Detection System for Large Networks" (1996) $19^{th}$ National Information Systems Security Conference, pp. 361-370.
Stewart "Akak Trojan Analysis" (Aug. 31, 2004) http://www.secureworks.com/research/threats/akak, pp. 1-2.
Stewart "Bobax Trojan Analysis" (May 17, 2004) http://www.lurhq.com/bobax.html, pp. 1-2.
Stewart "Dipnet/Oddbob Worm Analysis" (Jan. 13, 2005) SecureWorks, http://www.secureworks.com/research/threats/dipnet, pp. 1-2.
Stewart "I-Worm Baba Analysis" (Oct. 22, 2004) http://secureworks.com/research/threats/baba, pp. 1-7.
Stewart "Phatbot Trojan Analysis" (Mar. 15, 2004) http://www.secureworks.com/research/threats/phatbot, pp. 1-3.
Stewart "Sinit P2P Trojan Analysis" (Dec. 8, 2003) http://www.secureworks.com/research/threats/sinit, pp. 1-4.
Stewart "Top Spam Botnets Exposed" (Apr. 8, 2008) http://www.secureworks.com/cyber-threat-intelligence/threats/topbotnets, pp. 1-11.
Stone-Gross et al. "Pushdo Downloader Variant Generating Fake HTTP Requests" (Aug. 31, 2012) http://www.secureworks.com/cyber-threat-intelligence/threats/Pushdo_Downloader_Variant_Generating_Fake_HTTP_Requests, pp. 1-4.
Stone-Gross et al. "Your Botnet is My Botnet: Analysis of a Botnet Takeover" (Nov. 9-13, 2009) CCS'09 (13 pages).
Stover et al. "Analysis of the Storm and Nugache Trojans: P2P is here" (Dec. 2007) Login, vol. 32, No. 6, pp. 18-27.
Sullivan "Fighting Spam by Finding and Listing Exploitable Servers" (2006) Apricot, pp. 1-26.
Swatt IT "Bots, Drones, Zombies, Worms and Other Things That Go Bump in the Night" (2004) http://swatit.org/bots, pp. 1-6.
Symantec "Symantec Internet Security Threat Report" (Sep. 2004) Cupertino, CA, VI:1-57.
Symantec Global "Symantec Global Internet Security Threat Report: Trends for 2008" (Apr. 2009), Cupertino, CA, XIV:1-110.
Szor, "The Art of Computer Virus Research and Defense" (Feb. 2005) Addison-Wesley Professional (TOC).
Team CYMRU "Developing Botnets" (2010) http://www.team-cymru.com/ReadingRoom/Whitepapers/2010/developing-botnets.pdf, pp. 1-3.
Team CYMRU "IP to ASN Mapping" (Mar. 23, 2013) http://www.team-cymru.org/Services/ip-to-asn.html, (6 pages).
Templeton et al. "A Requires/Provides for Computer Attacks" (2000) 2000 Workshop on New Security Paradigms (NSPW'00), pp. 31-38.
Temu "BITZBLAZE: Binary Analysis for COTS Protection and Malicious Code Defense" (printed May 23, 2013) http://bitblaze.cs.berkeley.edu/temu.html, pp. 1-4.
Thimbleby et al. "A Framework for Modeling Trojans and Computer Virus Infection" (1999) *Computer Journal* 41(7):444-458.
Threat Encyclopedia "Virus:Win32/Expiro.Z" (Jun. 9, 2011) http://www.microsoft.com/security/portal/Threat/Encyclopedia/Entry.aspx, pp. 1-5.
Threatfire "Threatfire protects when your antivirus can't" (retrieved from Internet Archive on May 23, 2013) http://www.threatfire.com, pp. 1-18.
Trendmicro "2006 Press Releases: Trend Micro Takes Unprecedented Approach to Eliminating Botnet Threats with the Unveiling of InterCloud Security Service" (Sep. 25, 2006) http://www.trendmicro.com/en/about/news/pr/archive/2006/pr092506.htm, pp. 1-2.
Trendmicro "InterCloud Security Service", http:/www.trendmicro.com/en/products/nss/icss/evaluate/overiew.thm, pp. 1-2.
Trendmicro website (retrieved Oct. 2013) http://www.trendmicro.com/en/home/us/home.htm.
Uhlig et al. "Intel Virtualization Technology" (May 2005) *Computer* 38(5):48-56.
Urbanek "RJava: Low-Level-R to Java Interface" (May 6, 2013) pp. 1-5.
Uribl, http://www.uribl.com/about.shtml, retrieved from Internet Archive on Mar. 16, 2016, Archived Jul. 22, 2010, pp. 1-4.
Valdes et al. "Probabilistic Alert Correlation" (2001) Recent Attack in Intrusion Detection, LNCS 2212:54-68.
Valeur et al. "A Comprehensive Approach to Intrusion Detection Alert Correlation" (Jul. 2004) IEEE Transactions on Dependable and Secure Computing 1(3):146-169.
Vasudevan et al. "Cobra: Fine-Grained Malware Analysis Using Stealth Localized-Executions" (2006) IEEE Symposium on Security and Privacy (S&P'06), pp. 264-279.
Vasudevan et al. "Stealth Breakpoints" (2005) $21^{st}$ Annual Computer Security Applications Conference (ACSAC), pp. 381-392.
Vigna et al. "NetSTAT: A Network-Based Intrusion Detection Approach" (Dec. 7-11, 1998) $14^{th}$ Annual Computer Security Applications Conference (ACSAC '98), pp. 25-34.
Viruses "Troj/Agobot-IB" (printed Jun. 27, 2012) http://www.sophos.com/virusinfo/analyses/trojagobotib.html (1 page).
Vixie "DNS Complexity" (Apr. 24, 2007) *ACM Queue* pp. 24-29.
Vixie "What DNS is Not" (Dec. 2009) *Communications of the ACM* 52(12):43-47.
Vixie et al. "RFC 2136: Dynamic Updates in the Domain Name System (DNS Update)" (Apr. 1997) http://www.faqs.org/rfcs.rfc2136.html, pp. 1-25.
Vmware "Vmware Server" (retrieved from Internet Archive on May 23, 2013, Archived Sep. 26, 2006) http://www.vmware.com, pp. 1-32.
Wang et al. "Anagram: A Content Anomaly Detector Resistant to Mimicry Attack" (2006) International Symposium on Recent Advances in Intrusion Detection (RAID), pp. 1-20.
Wang et al. "Anomalous Payload-Based Network Intrusion Detection" (2004) $7^{th}$ International Symposium on Recent Advances in Intrusion Detection (RAID 2004) (20 pages).
Wang et al. "Anomalous Payload-Based Worm Detection and Signature Generation" (2005) International Symposium on Recent Advances in Intrusion Detection (RAID) (20 pages).
Wang et al. "Automated Web Patrol with Strider HoneyMonkeys: Finding Web Sites That Exploit Browser Vulnerabilities" (2006) NDSS'06, pp. 1-15.
Wang et al. "Modeling the Effects of Timing Parameters on Virus Propagation" (Oct. 27, 2003) ACM CCS Workshop on Rapid Malcode (WORM '03), Washington, DC, pp. 61-66.
Wang et al. "The Dilemma of Covert Channels Searching" (2006) ICISC 2005, LNCS 3935, pp. 169-174.
Weaver et al. "A Taxonomy of Computer Worms" (Oct. 27, 2003) WORM'03, pp. 11-18.

(56) References Cited

OTHER PUBLICATIONS

Weaver et al. "Redirecting DNS for ADS and Profit" (Aug. 2011) USENIX Workshop on Free and Open Communications on the Internet (FOCI), pp. 1-6.
Weaver et al. "Very Fast Containment of Scanning Worms" (Aug. 9-13, 2004) 13$^{th}$ USENIX Security Symposium, pp. 29-44.
Weimer "Passive DNS Replication" (2005) http://www.enyo.de/fw/software/dnslogger, pp. 1-6.
Weimer "Passive DNS Replication" (Apr. 2005) 17$^{th}$ Annual First Conference on Computer Security Incident (13 pages).
Welch et al. "Strike Back: Offensive Actions in Information Warfare" (1999) AMC New Security Paradigm Workshop, pp. 47-52.
Wessels et al. "Measurements and Laboratory Simulations of the Upper DNS Hierarchy" (2005) PAM, pp. 1-10.
Whyte "Exposure Maps: Removing Reliance on Attribution During Scan Detection" (2006) 1st USENIX Workshop on Hot Topics in Security, pp. 51-55.
Whyte et al. "DNS-Based Detection of Scanning Worms in an Enterprise Network" (Feb. 3-4, 2005) 12$^{th}$ Annual Network and Distributed System Security Symposium, pp. 181-195.
Wikipedia Definition "Storm Botnet", printed Jan. 29, 2013) http://en.wikipedia.org/wiki/Storm_botnet, pp. 1-7.
Wikipedia Definition "Windows Virtual PC", http://en.wikipedia.org/wiki/Windows_Virtual_PC, Last Modified May 5, 2013, pp. 1-21.
Willems et al. "Toward Automated Dynamic Malware Analysis Using CWSandbox" (2007) IEEE Security and Privacy, 5(2):32-39.
Williams "What We Know (and Learn) for the Waledac Takedown" (Mar. 15, 2010) http://blogs.technet.com/b/mmpc/archive/2010/03/15/what-we-know-and-learned-form-the-waledac-takedown-aspx, pp. 1-3.
Williamson et al. "Virus Throttling for Instant Messaging" (Sep. 2004) Virus Bulletin Conference, Chicago, IL, USA, pp. 1-13.
Wolf "Technical Details of Srizbi's Domain Generation Algorithm" (Nov. 25, 2008) http://blog.fireeye.com/research/2008/11/technical-details-of-srizbis-domain-generation-algorithm.html, pp. 1-9.
Wu et al. "AGREP—A Fast Approximate Pattern-Matching Tool" (1992) USENIX Technical Conference (10 pages).
Wu et al. "An Effective Architecture and Algorithm for Detecting Worms with Various Scan Techniques" (Feb. 2004) 11th Annual Network and Distributed System Security Symposium (NDSS '04), pp. 1-14.
Wurzinger et al. "Automatically Generating Models for Botnet Detection" (2009) 14$^{th}$ European Conference on Research in Computer Security (ESORICS'09), pp. 232-249.
Xie et al. "Spamming Botnet: Signatures and Characteristics" (Aug. 17-22, 2008) ACM SIGCOMM 2008 Conference on Data Communications (SIGCOMM'08), pp. 171-182.
Yadav et al. "Detecting Algorithmically Generated Malicious Domain Names" (Nov. 1-3, 2010) 10$^{th}$ Annual Conference of Internet Measurement (IMC'10), pp. 48-61.
Yang et al. "CARDS: A Distributed System for Detecting Coordinated Attacks" (2000) Sec, pp. 1-10.
Yegneswaran et al. "An Architecture for Generating Semantics-Aware Signatures" (2005) USENIX Security Symposium (16 pages).
Yegneswaran et al. "Global Intrusion Detection in the DOMINO Overlay System" (Feb. 2004) Network and Distributed Security Symposium (NDSS) (17 pages).
Yegneswaran et al. "On the Design and Use of Internet Sinks for Network Abuse Monitoring" (2004) RAID 2004, LNCS 3224, pp. 146-165.
Yegneswaran et al. "Using Honeynets for Internet Situational Awareness" (Nov. 2005) Fourth Workshop on Hot Topics in Networks (HotNets IV), pp. 1-6.
Yin et al. "Panorama: Capturing System-Wide Information Flow for Malware Detection and Analysis" (Oct. 29-Nov. 2, 2007) ACM Conference on Computer and Communication Security, pp. 1-13.
Zdrnja et al. "Passive Monitoring of DNS Anomalies" (2007) DIMVA Conference, pp. 1-11.
Zeus Tracker "Welcome to the ZeuS Tracaker" (retrieved from Internet Archive on May 23, 2013, Archived Oct. 26, 2010) https://zeustracker.abuse.ch, pp. 1-37.
Zhang et al. "Detecting Stepping Stones" (Aug. 14-17, 2000) 9$^{th}$ USENIX Security Symposium, Denver, Colorado, USA, pp. 1-15.
Zhang et al. "Highly Predictive Blacklisting" (2008) USENIX Security Symposium, pp. 107-122.
Zhou et al., "Dissecting Android Malware: Characterization and Evolution" (2012) IEEE Symposium on Security and Privacy, pp. 95-109.
Zhu et al. "Using Failure Information Analysis to Detect Enterprise Zombies" (2009) Lecture note of the Institute for Computer Science, Social-Informatics and Telecommunications Engineering 19(4):185-206.
Zou et al. "Code Red Worm Propagation Modeling and Analysis" (Nov. 18, 2002) 9$^{th}$ ACM Conference on Computer and Communications Security (CCS '02), pp. 1-10.
Zou et al. "Email Worm Modeling and Defense" (Oct. 27, 2004) 13$^{th}$ ACM International Conference on Computer and Communications Security (CCS '04) (6 pages).
Zou et al. "Monitoring and Early Warning for Internet Worms" (Oct. 2003) 10$^{th}$ ACM Conference on Computer and Communications Security (CCS '03) (10 pages).
Zou et al. "On the Performance of Internet Worm Scanning Strategies" (Nov. 2003) Technical Report TR-03-CSE-07, Umass ECE Dept. (16 pages).
Zou et al. "Routing Worm: A Fast, Selective Attack Worm Based on IP Address Information" (Jun. 1-3, 2005) Technical Report: TR-03-CSE-06, Principles of Advanced and Distributed Simulation (PADS) pp. 199-206.
Zou et al. "Worm Propagation Modeling and Analysis Under Dynamic Quarantine Defense" (Oct. 27, 2003) WORM'03, Washington, DC USA (10 pages).
Kristoff, "Botnets, Detection and Mitigation: DNS-Based Techniques," NU Security Day (2005) 23 pages, www.it.northwesterd.edu/bin/docs/bots_Kristoff_jul05.ppt.
"Spamming Botnets: Signatures and Characteristics" Xie et al; ACM SIGCOMM. Settle. WA; Aug. 2008; 12 pages (Year: 2008).

\* cited by examiner

COLLECT NXs FROM HONEYPOTS AND REAL NETWORK AND GROUP INTO SETS OF 10 NXs

210

USE NXs TO CREATE TRAINING VECTORS BY TAKING EACH SET OF 10 DOMAIN NAMES AND COMPUTING VARIOUS STATISTICAL VALUES AND PUTTING THE STATISTICAL VALUES IN A VECTOR

300

305

COLLECT NXs FROM REAL NETWORK AND
GROUP INTO SETS OF 10 NXs

310

USE NXs TO CREATE TESTING VECTORS BY
TAKING EACH SET OF 10 DOMAIN NAMES
AND COMPUTING VARIOUS STATISTICAL
VALUES AND PUTTING THE STATISTICAL
210       VALUES IN A VECTOR

315

CLASSIFY TESTING VECTORS AS BENIGN
VECTORS OR MALICIOUS VECTORS

405
USE META-CLASSIFIER (COMBINATION OF MANY GENERIC CLASSIFIERS)

410
CLASSIFY VECTORS BY: USING SIMPLE INTERNAL ASSETS INFECTED WITH KNOWN MALWARE; SIMPLE INTERNAL ASSETS INFECTED WITH UNKNOWN MALWARE; COMPLEX INTERNAL NETWORK ASSETS

FIGURE 5

```
                                                              o -- (dns01)
                                                              |
                           (GW)                               |
[Internet] -- (eth0) -- (kritis) -- (eth(1,2,3)) -- (vmnet34) -- o -- (dns02)
    |                                                         |
    |                                                         |
    |                                                         o -- (dns03)
[minoas]
```

FIGURE 6

1st: The average of domain name length

2nd: The standard deviation of the domain name length

3rd: The number of different TLDs

4th: The length of the domain name (excluding the TLD)

5th: The median of the number of unique characters

6th: The average of the number of unique characters

7th: The standard deviation of the number of unique characters

8th: The median of unique 2-grams

9th: The average of unique 2-grams

10th: The standard deviation of unique 2-grams

11th: The frequency of .com TLDs over frequency of the rest TLDs

12th: The median of unique 3-grams

13th: The average of unique 3-grams

14th: The standard deviation of unique 3-grams

15th: The median count of unique TLDs

16th: The average count of unique TLDs

17th: The standard deviation count of TLDs

FIGURE 7

705 fpemcjfbv.com
odkigktjzv.biz
odkigktjzv.biz.inter1.com
l-sjn-sevans.ca1.intern2.com
xvoal.com
ymtaiwwprpq.biz
ymtaiwwprpq.biz.inter1.com
bcbkdfkg.net
bcbkdfkg.net.inter1.com
okxixsulas.net

| Class | FP | TP |
|---|---|---|
| conficker-B | 0.000539035127122 | 0.855427713857 |
| conficker-C | 0.0 | 0.998998998999 |
| conficker-A | 0.026500179622 | 0.997997997998 |
| sinowal | 0.0 | 1.0 |
| unknownBot | 0.000257842715943 | 1.0 |
| bobax | 0.00107807025424 | 1.0 |

FIGURE 10

```
...     ----|
www.cb3e657b.com |
www.cba4772d.com |
www.cc04aff3.com |
www.cc9d51d7.com |
www.cced67b5.com |
www.cd4b4b03.com |
www.cd6297c3.com |
www.cdb20e03.com \
www.cdf4da40.com --> Sample from domain names that produce vectors that were
www.ce8c8da1.com /  labeled as unknown from the Meta-Classifier. This set
www.cecd6b2f.com |  of domain names gave us the initial seed for building
www.cee595e9.com |  the class unknownBot.
www.cf1d0a91.com |
www.d0186a4b.com |
www.d061611e.com |
www.d082b59f.com |
www.d09b0042.com |
     ...    ----|
```

METHOD AND SYSTEM FOR DETECTING MALWARE

CROSS-REFERENCED TO RELATED APPLICATIONS

The present application is a continuation application of U.S. patent application Ser. No. 14/041,796 entitled, "METHOD AND SYSTEM FOR DETECTING MALWARE," filed on Sep. 30, 2013, which is a Continuation of U.S. patent application Ser. No. 12/985,140 filed Jan. 25, 2011, now U.S. Pat. No. 9,525,699, entitled, "METHOD AND SYSTEM FOR DETECTING MALWARE," which claims benefit of priority under 35 U.S.C. 119(e) to the filing date of U.S. Provisional Patent Application 61/292,592 filed Jan. 14, 2010, entitled, "METHOD AND SYSTEM FOR DETECTING MALWARE," and U.S. Provisional Patent Application 61/295,060 filed Jan. 14, 2010, entitled, "METHOD AND SYSTEM FOR DETECTING MALWARE," the contents of which are incorporated herein by reference in their entireties.

BRIEF DESCRIPTION OF THE FIGURES

FIGS. 2-4 illustrate a method for detecting malware, according to one embodiment.

FIG. 5 illustrates various elements involved in domain name resolution.

FIGS. 6-10 illustrate examples for detecting malware, according to several embodiments.

DESCRIPTION OF EMBODIMENTS OF THE INVENTION

Figure 1:
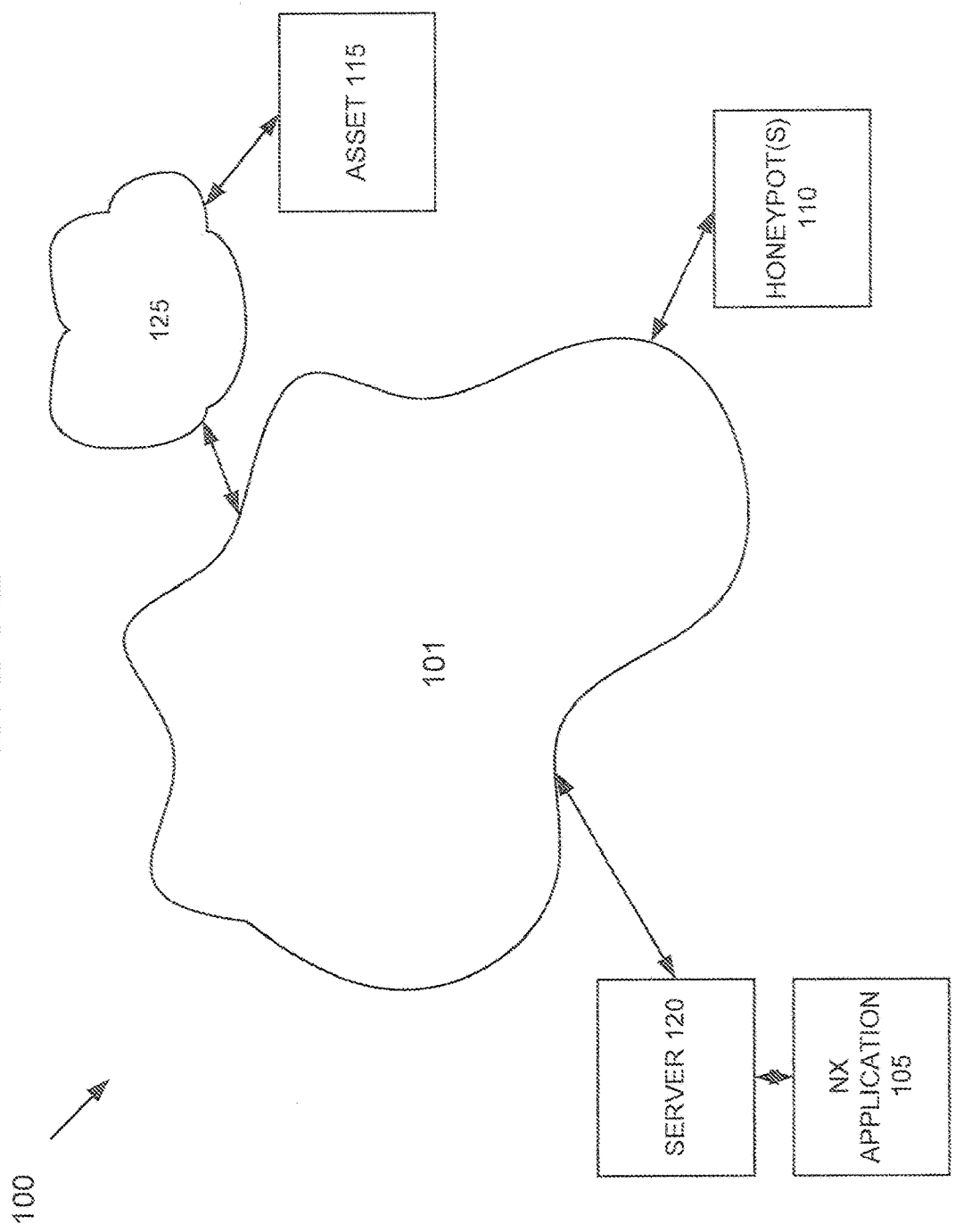
FIG. 1 illustrates a system for detecting malware, according to one embodiment.

FIG. 1 illustrates a system for detecting malware, according to one embodiment. FIG. 1 illustrates at least one network 101 (e.g., the Internet) connecting at least one NX application 105 (described below) on at least one server 120 to at least one honeypot 110 and at least one entity's network 125 (e.g., a private network of a company). The NX application 105 can determine if one or more assets 115 (e.g., computers) on the at least one entity's network 125 is infected with malware. It should be noted that the asset can be a simple asset (e.g., mainframe hardware, storage) or a complex asset (e.g., licensed software).

The determination of whether an asset is infected can comprise: collecting NX domain names from at least one honeypot and at least one asset; using the honeypot NX domain names to create training vectors; using the real network NX domain names to create testing vectors; classifying the testing vectors as benign vectors or malicious vectors; and classifying the at least one asset in the at least one real network as infected if the NX testing vector created from the real network NX domain names is classified as a malicious vector. (It should be noted that the testing vectors can be classified using: simple internal assets infected with known malware; simple internal assets infected with unknown malware; or complex internal network assets; or any combination thereof.)

NX domain name information is useful because some malware takes advantage of existing domain name system (DNS) services such as free domain testing (e.g., determining whether a new domain name is available). Such malware can use a domain name generator that employs a seed, such as the date, together with an algorithm to generate a set of domain names. The command and control (C&C) can try to register the generated domain names until a registrable subset of domain names has been identified. An infected computer can then use those daily-generated set of domain names in order to establish a new communication channel with the C&C. The victim computers will employ the same seed (i.e. date) and algorithm to generate the same set of domain names. The victim computers will then use the generated domain names in attempts to contact the C&C computer. Eventually, each victim computer will find a domain name that was registered for the C&C computer to enable daily communication between the C&C computer and the victim computers. By changing the domain name for the C&C computer (e.g., daily), it becomes difficult to statically black list the domain names or the IP addresses of the C&C computer(s).

Thus, malware which uses the above domain name resolution to establish communication with a C&C can produce many NX-Domains (NXs), which can be domain names that have not been registered with an authoritative DNS and can be observable at a recursive DNS server ("RDNS"). RDNS servers map domain names to IP addresses, also called "resolving DNS queries". If such a mapping between a domain name and an IP address doesn't exist, the RNDS can send back to the initiator of the DNS query a "Non-Existence" response. The Non-Existence response can indicate that the domain name does not have an IP address, and is thus an NX-Domain (NX). Monitoring the NXs observable at a RDNS can provide the ability to collect all possible NXs generated from all computers connected to the RDNS.

FIG. 2 illustrates a method for creating training vectors, according to one embodiment. Referring to FIG. 2, in 205, malware NXs can be collected from at least one honeypot (e.g., an Internet-attached server that acts as a decoy, luring in potential hackers in order to study their activities and monitor how they are able to break into a system) by an NX application 105 and grouped into sets of, for example, 10.

The malware NXs can be collected so that a classifier can be trained in a controlled environment to recognize different categories of infected computers. For example, FIG. 5 illustrates a honeypot network configuration. In this example, the virtual machine names "kritis" operates as an internal virtual gateway for the virtual machines dns01, dns02 and dns03, which are infected with malware (e.g., sinowal worm, bobax worm). By monitoring the DNS traffic that originates from infected virtual machines dns01, dns02, and dns03, a pure seed of malware domain names can be obtained.

In FIG. 5. the computer called "minoas" can act as an open recursive DNS ((ORDNS), which can be a rDNS server willing to resolve a domain name for any host in the Internet—inside or outside its network) and as an authoritative DNS server for root DNS servers. By doing this, the minoas computer can provide NXs that appear to originate from the root DNS servers. This can force the malware to lookup the next domain name and not stop probing since the minoas computer does not allow the malware to contact the root servers. As indicated earlier, the malware needs to make contact with the C&C at least one time during a set period (e.g., daily). Thus, by providing NX answers to any domain name that the malware requests, the "minoas" computer can cause the malware to keep looking up all the generated domain names (e.g., 10,000) because no successful C&C connection will take place. In this way, all 10,000 domain names can be observed and can be used to train a statistical class that can identify malware based only on this traffic.

Referring again to FIG. 5, the "kritis" computer can be configured to give free Internet access to the dns01, dns02, and dns03 computers for one hour, and for the next eight hours to redirect the DNS traffic to the "minoas" computer. A simple IP table firewall "rotating rule" at the gateway point (e.g., at the "kritis" computer) can be used to do this.

The VMNET34 computer in FIG. 5 can be a virtual network connection between the virtual machines dns01, dns02, and dns03, and the virtual gateway "kritis".

Referring back to FIG. 2, in 210, training vectors can be created by taking each set of, for example, 10 domain names and computing various statistical values and putting the various statistical values in a vector. Example statistics are illustrated in FIG. 6, which is described in more detail below.

Those of ordinary skill in the art will see that training vectors can be created in many other ways, in addition to collecting NXs from honeypots, as described above.

Figure 3:
Figure 8:
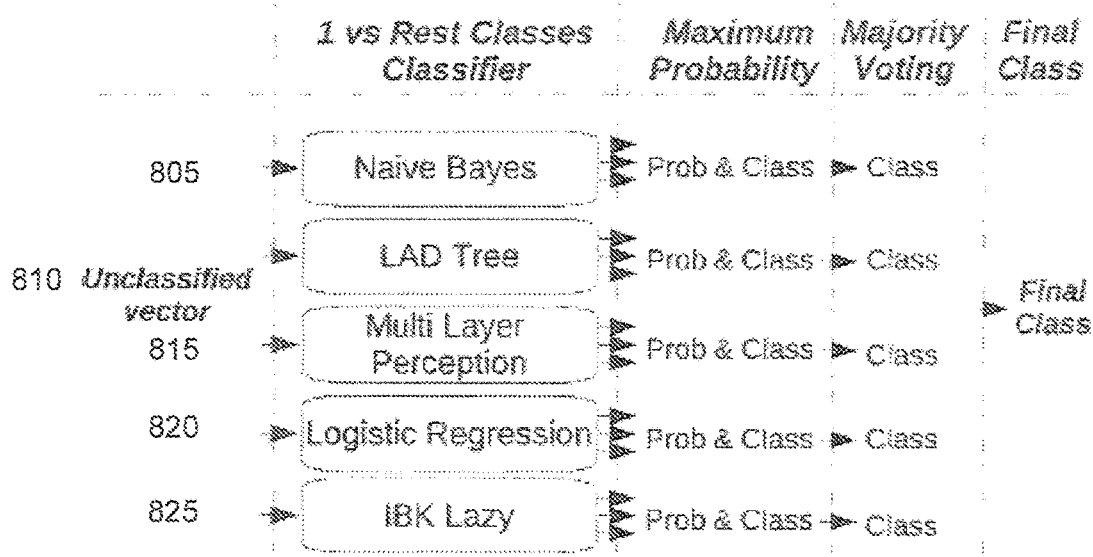

FIG. 3 illustrates a method for creating testing vectors, according to one embodiment. In 305, NXs are collected from a real network. In 310, the NXs from the real network can be used to create testing vectors by taking each set of, for example, 10 NX domain names and computing various statistical values and putting the various statistical values in a vector. (It should be noted that both the honeypot NXs and the real network NXs can be grouped in any number, and any algorithm can be used to group the sets.) It is not known if the testing NXs are malware or not. Thus, in 315, the testing vectors can be classified as benign vectors or malicious vectors by comparing testing vectors to training vectors. A classifier can use the knowledge obtained from the statistical information from the training vectors and compare it to the statistical information from the testing vectors to identify each different malware family in the testing NX vectors. FIG. 8 illustrates several types of classifiers that can be used to compare the vector information and identify different malware families. In particular, FIG. 8 illustrates the following classifiers: Naïve Bayes, LAD Tree, Multi-Layer Perception, Logistic Regression, and IBK Lazy. Those of ordinary skill in the art will see that many other types of classifiers can also be used. In addition, as explained in more detail below with respect to FIG. 8, a meta-classifier can use many different types of classifiers. In some embodiments, as also described in more detail below with respect to FIG. 8, a confidence score can also be given for each classifier, as well as for the meta-classifier.

For example, an absolute timing sequence, which can list the domain names in the order that they are received, can be used to group together an example set of ten NX domain names (e.g., from a real network):

fpemcjfbv.com
odkigktjzv.biz
odkigktjzv.biz.ebay.com
l-sjn-sevans.cal.paypal.com
xvoal.com
ymtaiwwprpq.biz
ymtaiwwprpq.biz.ebay.com
bcbkdfkg.net
bcbkdfkg.net.ebay.com
okxixsulas.net An example of various statistical values that can be computed for the set of NX domain names is illustrated in FIG. 6. Note that many other types of statistical values can be computed, and that the vector can have more or less statistical values than that called for in FIG. 6 (e.g., 17). Thus, for the example of 10 NX domain names provided above, the following statistical values can be computed. It should be noted that some or all of these statistical values can be computed. In addition, other statistical values can be computed and used.

The average of domain name length (not including ".") (e.g., the domain name length of the first domain name is 13). [Value ≈12.8333]

The standard deviation of the domain name length. [Value ≈1.9507]

The number of different Top Level Domains (TLDs). [Value ≈3.0]

The length of the longest domain name (excluding the TLD). [Value ≈24.0]

The median of the frequency of each unique character across the entire set of domain names (e.g., the frequency of "o" across the entire set of 10 domain names above is 10). [Value ≈2.0]

The average frequency of each unique character across the entire set of domain names. [Value ≈2.2083]

The standard deviation of the frequency of each unique character across the entire set of domain names. [Value ≈0.9565]

The median of the frequency of each unique 2-gram across the entire set of 10 domain names (e.g., the frequency of "fp" across the entire set of 10 domain names above is 1) (Note that if there is a "." (e.g., "v.c") between two characters, the frequency is counted as 0.) [Value ≈0.9565]

The average of the frequency of each unique 2-gram across the entire set of 10 domain names. [Value ≈1.0]

The standard deviation of the frequency of each unique 2-gram across the entire set of 10 domain names. [Value ≈1.0]

The frequency of .com TLDs over the frequency of the other of TLDs. [Value ≈1.5]

The median of the frequency of each unique 3-gram across the entire set of 10 domain names. [Value ≈0.3333]

The average of the frequency of each unique 3-gram across the entire set of 10 domain names. [Value ≈1.0]

The standard deviation of the frequency of each unique 3-gram across the entire set of 10 domain names. [Value ≈1.0]

The median count of unique TLDs (excluding .com). [Value ≈2.0]

The average count of unique TLDs (excluding .com). [Value ≈2.0]

The standard deviation for the different frequencies for each different TLD in the set of domain names. [Value ≈2.0]

The various statistical values for each set of 10 domain names from the real network NXs can be put in a vector. An example illustrating the domain names being transformed to statistical vectors, using the statistical values set forth in FIG. 6, is illustrated in FIG. 7. Referring to FIG. 7, in 705, the 10 domain names used to create the vector are listed. Note that all of these domain names can come from one particular asset 115 (e.g., an infected computer) in the real network 125:

fpemcjfbv.com
odkigktjzv.biz
odkigktjzv.biz.interl.com
l-sjn-sevans.cal.intern2.com
xvoal.com
ymtaiwwprpq.biz
ymtaiwwprpq.biz.interl.com
bcbkdfkg.net
bcbkdfkg.net.interl.com okxixsulas.net The 17 statistical values corresponding to the statistical values found in FIG. 6 are illustrated in the vector 710: [12.8333, 1.9507, 3.0, 24.0, 2.0, 2.2083, 0.9565, .9565, 1.0, 1.0, 1.5, 0.3333, 1.0, 1.0, 0.0, 2.0, 2.0, 2.0].

The NX application 105 can then utilize a meta-classifier to classify the testing vectors. The meta-classifier is a hybrid classifier and can comprise several generic classifiers. The various generic classifiers can be used (e.g., in parallel) to capture various different statistical properties which can potentially lower false positives (FP) and increase true positives (TP).

For example, FIG. 8 illustrates a meta-classifier that is comprised of five different classifiers: the Naïve Bayes classifier 805, the LAD Tree classifier 810, the Multi-Layer Perception Neural Network classifier 815, the Logistic Regression classifier 820, and the IBK Lazy Classifier 825. The maximum probability includes the classification (given by a particular classifier for the malware) and the probability of this classification being correct. Thus, for example, five different types of classifiers can be used to classify the malware as follows:

Classifier 1 (Naive Bayes Meta.) is: notknown (Confidence: 1)

Classifier 2 (Multi Layer Per. Meta.) is: conficker-B (Confidence: 0.985572986223)

Classifier 3 (Logistic Regression Meta.) is: conficker-B (Confidence: 0.374297598072)

Classifier 4 (LADtree Meta.) is: conficker-B (Confidence: 0.220571723953)

Classifier 5 (Lazy IB1 Meta.) is: conficker-B (Confidence: 1)

The majority voting can take the many classifications and determine which classification the majority of classifiers found. Thus, for the example above, conficker-B was the classification the majority of classifiers classified the malware as. The final class is the final classification based on the majority voting, which is conficker-B.

It should be noted that the meta-classifier can use any number and any type of known or unknown classifier, including, but not limited to, the above classifiers. The Naïve Bayes classifier can use estimator classes. Numeric estimator precision values can be chosen based on analysis of the training data. The LAD tree classifier can generate a multi-class alternating decision tree using a LogitBoost strategy. The Multi-Layer Perception Neural Network classifier can use back-propagation to classify instances. The Logistic Regression classifier can build linear logistic regression models. LogitBoost with simple regression can function as a base learner and can be used for fitting the logistic models. The IBK Lazy classifier can use normalized Euclidean distance to find the training instance closest to the given test instance, and can predict the same class as the training instance. If multiple instances have the same (smallest) distance to the test instance, the first one found can be used.

Additional information about all of the above classifiers can be found in Richard O. Duda et al., PATTERN CLASSIFICATION (2nd. Edition), which is herein incorporated by reference. Further information about the IBK Lazy classifier can be found in Niels Landwehr et al, LOGISTIC MODEL TREES (2005), which is also herein incorporated by reference.

For example, each classifier in the meta-classifier can classify vector 710 as follows:

Classifier 1 (Naive Bayes Meta.) is: notknown (Confidence: 1)

Classifier 2 (Multi Layer Per. Meta.) is: conficker-B (Confidence: 0.985572986223)

Classifier 3 (Logistic Regression Meta.) is: conficker-B (Confidence: 0.374297598072)

Classifier 4 (LADtree Meta.) is: conficker-B (Confidence: 0.220571723953)

Classifier 5 (Lazy IB1 Meta.) is: conficker-B (Confidence: 1)

Using the classification of the vector by each classifier, if a confidence threshold is set to be >=0.9 (note that this value can be set by the user), the meta-classifier can classify the vector (or statistical instance) as follows:

Instance 1 Meta classification detection result: conficker-B with majority voting value: 4 with confidence (med/std): (0.985572986223/0.345308923709). This means that a majority of four (out of five) of the classifiers found the vector to be classified as conficker-B. The median confidence score is the median of all five of the confidence scores, divided by the standard deviation of all five of the classifiers. It should be noted that, because the confidence threshold is set to be >=0.9, this number is only meaningful if the median confidence score is >=0.9.

FIG. 9 illustrates False Positive (FP) and True Positive (TP) classification results from the meta-classifier of FIG. 8 to one of six different malware classes: conficker-A, conficker-B, conficker-C, sinowal, bobax, and unknown. FIG. 9 indicates a FP value and a TP value for each type of malware. The FP rate is the False Positive detection rates for each different class. The TP rate is the True Positives detection rates for each different class. The FP rate can correspond to the percentage of vectors mistakenly classified as malicious which were actually benign. The TP rate corresponds to the percentage of vectors classified as malicious that were actually malicious. The following article, which is herein incorporated by reference, describes FP and TP rates in more detail: Axelsson. S., *The Base-Rate Fallacy and the Difficulty of Intrusion Detection*, ACM TRANS. INF. SYST. SECUR. 3, 3 (Aug. 2000), 186-205.

It should be noted that the meta-classifier can be independent from the manner in which the NXs are collected. It is only necessary to keep a mapping between the internal asset that the NXs originated from. The detection flow is satisfied as long as the monitoring system in the real network collects NXs from the same internal asset and groups them into sets of 10 using the absolute timing sequence. This is because the classifier can be trained to detect such behavior. Thus, the trained classifier can utilize domain names collected in the same way in real time.

FIG. 9 also illustrates how domain names from known malware (e.g., sinowal, bobax, conficker) can be classified by the meta-classifier using information learned from the training set. Domain names that do not match the training set can be classified as "notknown" or "unknownBot". Hand verification or other methods can be used to classify the "notknown" domain names.

It should be noted that if many NXs are classified as "unknown", either a DNS issue causes such characterization, or the NXs are from malware where little or no information about the malware is known (e.g., a new worm). DNS issues can include a DNS outage or DNS misconfiguration. If a DNS issue is the cause of the high number of "unknown" classifications, the NXs can be classified as legitimate using for example, alexa.com, or a passive DNS feed. A passive DNS feed can be a technology which constructs zone replicas without cooperation from zone administrators, based on captured name server responses (see, e.g., F. Weimer, Passive DNS Replications, http://www.enyo.de/fw/software/dnslogger/2007, which is herein incorporated by reference). An example of a passive DNS feed is a DNSParse, which can be, for example, an implementation of the passive DNS technology by the University of Auckland in New Zealand (see, e.g., https://dnsparse.insec.auckland.ac.nz/dns/2007, which is herein incorporated by reference).

FIG. 10 illustrates an example of how to identify similar patterns in NXs and use those patterns to train a new class (e.g., an unknown-bot class). For example, reviewing the NXs of FIG. 10, a person or computer program could determine malware patterns such as, but not limited to: a size of 8 (after www) with a top level domain of .com.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method of analysis, comprising:
    collecting, using at least one decoy virtual machine, honeypot NX domain names from at least one known infected asset in at least one real network, the honeypot NX domain names being domain names that are not registered;
    collecting, using the at least one decoy virtual machine, real network NX domain names from at least one asset in the at least one real network;
    grouping the honeypot NX domain names and the real network NX domain names based on statistical similarities;
    creating at least one training vector, wherein the at least one training vector is created by:
        computing various statistical values for at least one group of the honeypot NX domain names, and
        collecting the various statistical values for the at least one group of the honeypot NX domain names in at least one vector;
    creating, using the real network NX domain names, a plurality of testing vectors, wherein the plurality of testing vectors are created by:
        computing various statistical values for at least one group of the real network NX domain names, and
        collecting the various statistical values for the at least one group of the real network NX domain names in the plurality of testing vectors;
    classifying each of the testing vectors as benign vectors or malicious vectors based on the at least one training vector; and
    classifying the at least one asset in the at least one real network as infected if at least one of the plurality of testing vectors is classified as a malicious vector.

2. The method of claim 1, further comprising classifying previously unclassified malware from the honeypot NX domain names.

3. The method of claim 1, wherein only domain name system (DNS) NX domain name information is utilized to classify the at least one asset as infected.

4. The method of claim 1, wherein only NX domain traffic is utilized.

5. The method of claim 1, wherein a meta-classifier is utilized to classify the testing vectors as benign vectors or malicious vectors.

6. The method of claim 5, wherein the meta-classifier provides intelligence for identifying new malware.

7. The method of claim 1, wherein the classifying of the testing vectors is done using at least one meta-classifier, the at least one meta-classifier comprising at least one generic classifier.

8. The method of claim 1, further comprising classifying previously classified malware from the honeypot NX domain names.

9. The method of claim 1, wherein the honeypot NX domain names collected from the at least one known infected asset and the real network NX domain names collected from the at least one asset are grouped into sets of 10 using absolute timing sequence information.

10. A system of analysis, comprising:
    at least one computer connected to at least one network;
    at least one application executing in the at least one computer, the at least one application configured for:
        collecting, using at least one decoy virtual machine, honeypot NX domain names from at least one known infected asset in at least one real network, the honeypot NX domain names being domain names that are not registered;
        collecting, using the at least one decoy virtual machine, real network NX domain names from at least one asset in the at least one real network;
        grouping the honeypot NX domain names and the real network NX domain names based on statistical similarities;
        creating at least one training vector, wherein the at least one training vector is created by:
            computing various statistical values for at least one group of the honeypot NX domain names, and
            collecting the various statistical values for the at least one group of the honeypot NX domain names in at least one vector;
        creating, using the real network NX domain names, a plurality of testing vectors, wherein the plurality of testing vectors are created by:
            computing various statistical values for at least one group of the real network NX domain names, and
            collecting the various statistical values for the at least one group of the real network NX domain names in the plurality of testing vectors;
        classifying each of the testing vectors as benign vectors or malicious vectors based on the at least one training vector; and
        classifying the at least one asset in the at least one real network as infected if at least one of the plurality of testing vectors is classified as a malicious vector.

11. The system of claim 10, wherein the at least one application is further configured for classifying previously unclassified malware from the honeypot NX domain names.

12. The system of claim 10, wherein only domain name system (DNS) NX domain name information is utilized to classify the at least one asset as infected.

13. The system of claim 10, wherein only NX domain traffic is utilized.

14. The system of claim 10, wherein a meta-classifier is utilized to classify the testing vectors as benign vectors or malicious vectors.

15. The system of claim 14, wherein the meta-classifier provides intelligence for identifying new malware.

16. The system of claim 10, wherein the classifying of the testing vectors is done using at least one meta-classifier, the at least one meta-classifier comprising at least one generic classifier.

17. The system of claim 10, wherein the at least one application is further configured for classifying previously classified malware from the honeypot NX domain names.

18. The system of claim 10, wherein the honeypot NX domain names collected from the at least one known infected asset and the real network NX domain names collected from the at least one asset are grouped into sets of 10 using absolute timing sequence information.

* * * * *